US012728819B2

(12) United States Patent
LaCross et al.

(10) Patent No.: US 12,728,819 B2
(45) Date of Patent: Sep. 8, 2026

(54) VEHICULAR EXTERIOR CAMERA ASSEMBLY WITH SELF CLEANING SYSTEM

(71) Applicant: Magna Mirrors of America, Inc., Holland, MI (US)

(72) Inventors: Anthony J. LaCross, Hastings, MI (US); Connor G. Cervone, Byron Center, MI (US); Austen C. Peterson, Hudsonville, MI (US); Kenneth C. Peterson, Ada, MI (US); Bryce A. Hilborn, Grand Rapids, MI (US); Rudy A. Morey, Hudsonville, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 171 days.

(21) Appl. No.: 18/418,668

(22) Filed: Jan. 22, 2024

(65) Prior Publication Data

US 2024/0246513 A1 Jul. 25, 2024

Related U.S. Application Data

(60) Provisional application No. 63/497,456, filed on Apr. 21, 2023, provisional application No. 63/481,190, filed on Jan. 24, 2023.

(51) Int. Cl.

| | |
|---|---|
| ***B60S 1/08*** | (2006.01) |
| ***B60S 1/28*** | (2006.01) |
| ***B60S 1/56*** | (2006.01) |
| ***H04N 23/51*** | (2023.01) |
| ***H04N 23/57*** | (2023.01) |
| *B60S 1/52* | (2006.01) |

(52) U.S. Cl.
CPC ............... *B60S 1/0818* (2013.01); *B60S 1/28* (2013.01); *B60S 1/56* (2013.01); *H04N 23/51* (2023.01); *H04N 23/57* (2023.01); *B60S 1/522* (2013.01)

(58) Field of Classification Search
CPC .. B60S 1/0818; B60S 1/28; B60S 1/56; B60S 1/522; H04N 23/51; H04N 23/57
USPC .......................................................... 348/148
See application file for complete search history.

(56) References Cited

U.S. PATENT DOCUMENTS

| | | | | |
|---|---|---|---|---|
| 3,999,241 A * | 12/1976 | Mafnas | B60S 1/365 15/250.21 |
| 4,293,981 A * | 10/1981 | Smith | A22C 29/021 452/1 |
| 5,357,771 A * | 10/1994 | Schaal | D06F 43/00 34/92 |
| 5,550,677 A | 8/1996 | Schofield et al. | |

(Continued)

*Primary Examiner* — Matthew David Kim
(74) *Attorney, Agent, or Firm* — HONIGMAN LLP

(57) ABSTRACT

A vehicular camera module includes a housing assembly that includes an inner housing element that accommodates a transparent cover element and that is pivotable relative to an outer housing element that mounts at a vehicle. A camera is accommodated by the housing assembly and mounted to the outer housing element. The camera views exterior of the vehicle via the cover element. An outer surface of the cover element is exposed exterior of the vehicle and, when the inner housing element and the cover element pivot relative to the outer housing element, a wiper of the outer housing element engages the outer surface of the cover element to remove moisture and/or debris from the outer surface of the cover element.

23 Claims, 45 Drawing Sheets

(56) References Cited

U.S. PATENT DOCUMENTS 5,670,935 A 9/1997 Schofield et al.
5,949,331 A 9/1999 Schofield et al.
7,627,235 B2 12/2009 McCutchen et al.
8,567,963 B1 10/2013 Criscuolo et al.
8,671,504 B2 3/2014 Ono et al.
8,985,635 B2 * 3/2015 Hurley .................. F24F 13/222 285/179
9,319,637 B2 4/2016 Lu et al.
9,604,601 B2 3/2017 Hsiao et al.
9,707,896 B2 7/2017 Boegel et al.
10,399,509 B2 9/2019 Byrne et al.
10,589,726 B1 3/2020 Ingram
10,604,121 B2 3/2020 Blank
11,140,301 B2 10/2021 Condron et al.
11,479,164 B2 * 10/2022 Lettis ........................ B60R 1/12
11,889,171 B2 1/2024 Condron
2006/0237075 A1 * 10/2006 Betz ...................... F16K 15/147 137/846
2009/0250533 A1 10/2009 Akiyama et al.
2010/0089417 A1 * 4/2010 Nelson .................. B60S 1/3801 15/250.04
2011/0073142 A1 3/2011 Hattori et al.
2011/0181725 A1 7/2011 Matsuura
2011/0225724 A1 9/2011 Bronstein
2011/0292212 A1 12/2011 Tanabe et al.
2012/0117745 A1 5/2012 Hattori et al.
2012/0243093 A1 9/2012 Tonar et al.
2013/0092758 A1 4/2013 Tanaka et al.
2013/0094086 A1 4/2013 Bochenek
2013/0146577 A1 6/2013 Haig et al.
2013/0209079 A1 8/2013 Alexander et al.
2013/0255023 A1 10/2013 Kikuta et al.
2013/0319486 A1 12/2013 Kikuta et al.
2014/0060582 A1 3/2014 Hartranft et al.
2014/0232869 A1 8/2014 May et al.
2015/0059106 A1 3/2015 Rief et al.
2015/0138357 A1 5/2015 Romack et al.
2015/0151721 A1 6/2015 Wadzinski
2015/0183404 A1 7/2015 Romack et al.
2015/0277111 A1 10/2015 Bell et al.
2015/0344001 A1 12/2015 Lopez Galera et al.
2015/0353024 A1 12/2015 Cooper
2016/0103316 A1 4/2016 Rousseau
2016/0272163 A1 9/2016 Dreiocker et al.
2017/0036647 A1 2/2017 Zhao et al.
2017/0210351 A1 7/2017 Ghannam et al.
2017/0349147 A1 * 12/2017 Blank ..................... B60S 1/566
2018/0207691 A1 7/2018 Byrne et al.
2018/0361998 A1 12/2018 Renaud
2019/0039531 A1 * 2/2019 Wilson .................... B60S 1/528
2019/0041234 A1 2/2019 Ghannam
2019/0146213 A1 * 5/2019 Slama .................... H04N 23/51 359/511
2019/0149813 A1 * 5/2019 Sun ........................ G03B 43/00 348/187
2019/0299938 A1 10/2019 Deegan
2020/0070778 A1 * 3/2020 Fan .................... G02B 27/0006
2020/0114877 A1 4/2020 Hu
2020/0254979 A1 8/2020 Bretagnol
2020/0307523 A1 * 10/2020 Kim ........................ B08B 1/165
2021/0094474 A1 * 4/2021 Vetter ..................... B60S 1/528
2021/0197221 A1 * 7/2021 Rachow .................... B60S 1/52
2022/0118950 A1 * 4/2022 Ida ............................ B60S 1/56
2023/0011681 A1 * 1/2023 Vadali .................. A61B 1/3132
2024/0132023 A1 * 4/2024 Herman .................... B08B 3/02
2024/0147036 A1 5/2024 Sun et al.

* cited by examiner 362
344
342
356
364

357
362
344
342
356a
356b
364

364
356b
356a
342
357
344

416
414
418
424
466
460

424
414
416
418
466
460

414
424
416
418
466
460

VEHICULAR EXTERIOR CAMERA ASSEMBLY WITH SELF CLEANING SYSTEM

CROSS REFERENCE TO RELATED APPLICATIONS

The present application claims the filing benefits of U.S. provisional application Ser. No. 63/497,456, filed Apr. 21, 2023, and U.S. provisional application Ser. No. 63/481,190, filed Jan. 24, 2023, which are hereby incorporated herein by reference in their entireties.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A driving assistance system or vision system or imaging system for a vehicle utilizes one or more cameras (such as one or more CMOS cameras) to capture image data representative of images exterior of the vehicle. The vision system or imaging system provides the communication/data signals, including camera data or captured image data, that may be displayed at a display screen that is viewable by the driver of the vehicle, such as when the driver is backing up the vehicle, and that may be processed and, responsive to such image processing, the system may detect an object at or near the vehicle and in the path of travel of the vehicle. The vision system may be operable to display a surround view or bird's eye view of the environment at or around or at least partially surrounding the subject or equipped vehicle, and the displayed image may include a displayed image representation of the subject vehicle.

A camera module for the vision system may include a camera mounted at a vehicle so as to have a field of view exterior of the vehicle. A cover assembly includes a mounting portion and an inner housing that is pivotable relative to the mounting portion. The mounting portion is configured to attach at the vehicle. The inner housing accommodates a transparent cover element that is pivotable with the inner housing relative to the mounting portion. The camera is accommodated by the cover assembly and the mounting portion is mounted at the vehicle so that the camera views exterior of the vehicle and through the transparent cover element of the cover assembly. An outer surface of the transparent cover element is exposed exterior of the vehicle. As the transparent cover element and the inner housing pivot relative to the mounting portion, the outer surface of the transparent cover element moves at least partially along an inner surface of the mounting portion. One or more wiper elements are disposed at an inner surface of the mounting portion and between the inner surface of the mounting portion and the outer surface of the transparent cover element. As the inner housing and the transparent cover element pivot relative to the mounting portion, the transparent cover element moves relative to the one or more wiper elements and the one or more wiper elements engage the outer surface of the transparent cover element and move at least partially along the outer surface of the transparent cover element to remove moisture and/or debris from the outer surface of the transparent cover element.

A camera module for the vision system may include a camera mounted at a vehicle so as to have a field of view exterior of the vehicle. The camera is accommodated by a housing that attaches at the vehicle. A transparent cover element is rotatably mounted at the housing, and the camera views exterior of the vehicle and through the transparent cover element. An outer surface of the transparent cover element is exposed exterior of the vehicle. A turbine is mechanically coupled to the transparent cover element. When a pressurized fluid, such as air or washer fluid, is driven across the turbine, the turbine rotatably drives the transparent cover element relative to the housing to remove moisture and/or debris from the outer surface of the transparent cover element.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
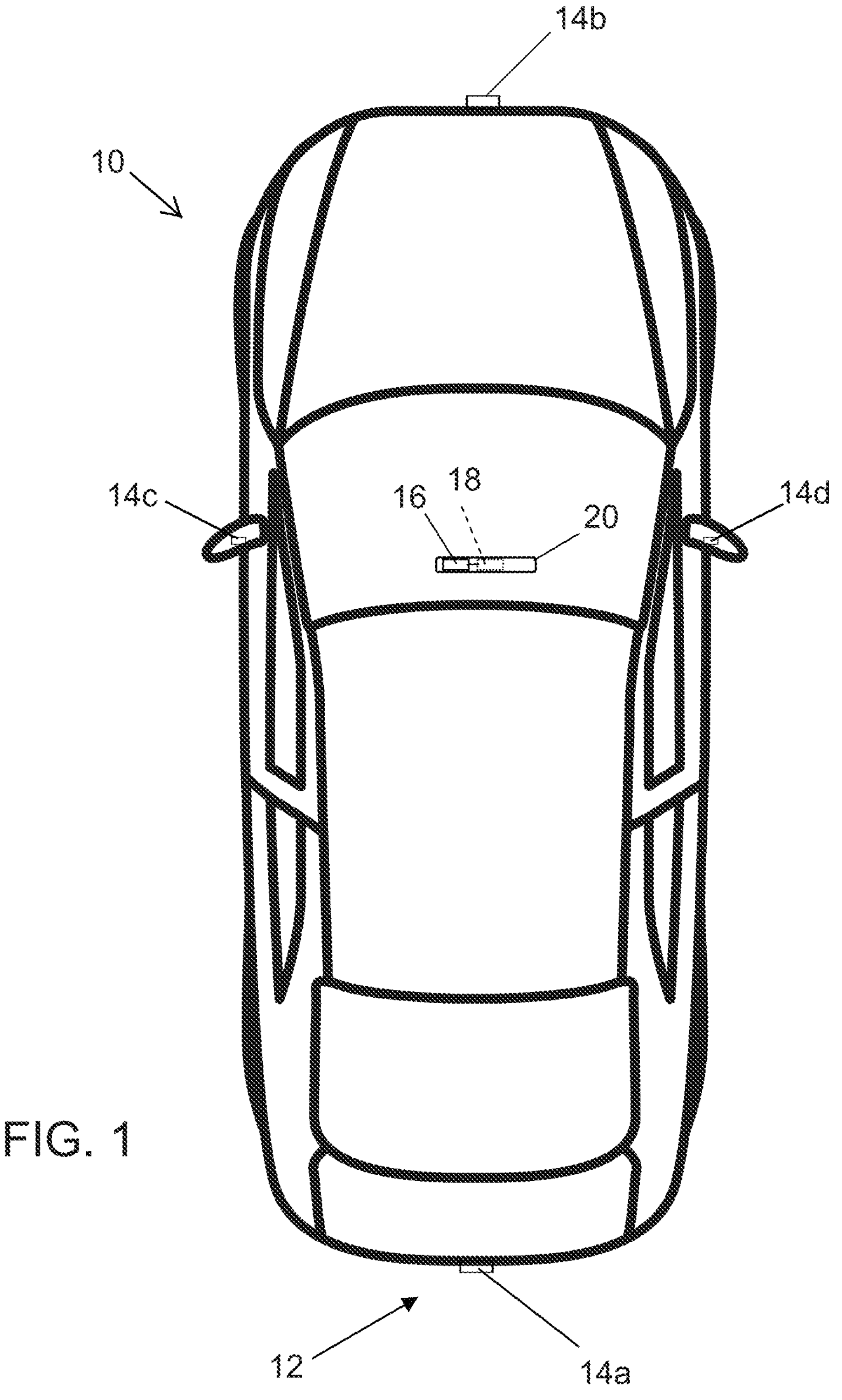
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

The camera module may be mounted at the vehicle so as to have an exterior field of view and the camera may view through a clear or transparent outer lens or cover element of a mounting assembly. The outer lens may be coupled to an inertial camera cleaning system that passively or actively cleans the outer lens to remove dirt, moisture, and other contaminants and occlusions from the optical path of the camera. For example, the cleaning system may move the outer lens in an oscillating motion relative to a mounting bracket and the camera module to clean the lens without mechanically obstructing the optical path of the camera.

Figure 2:
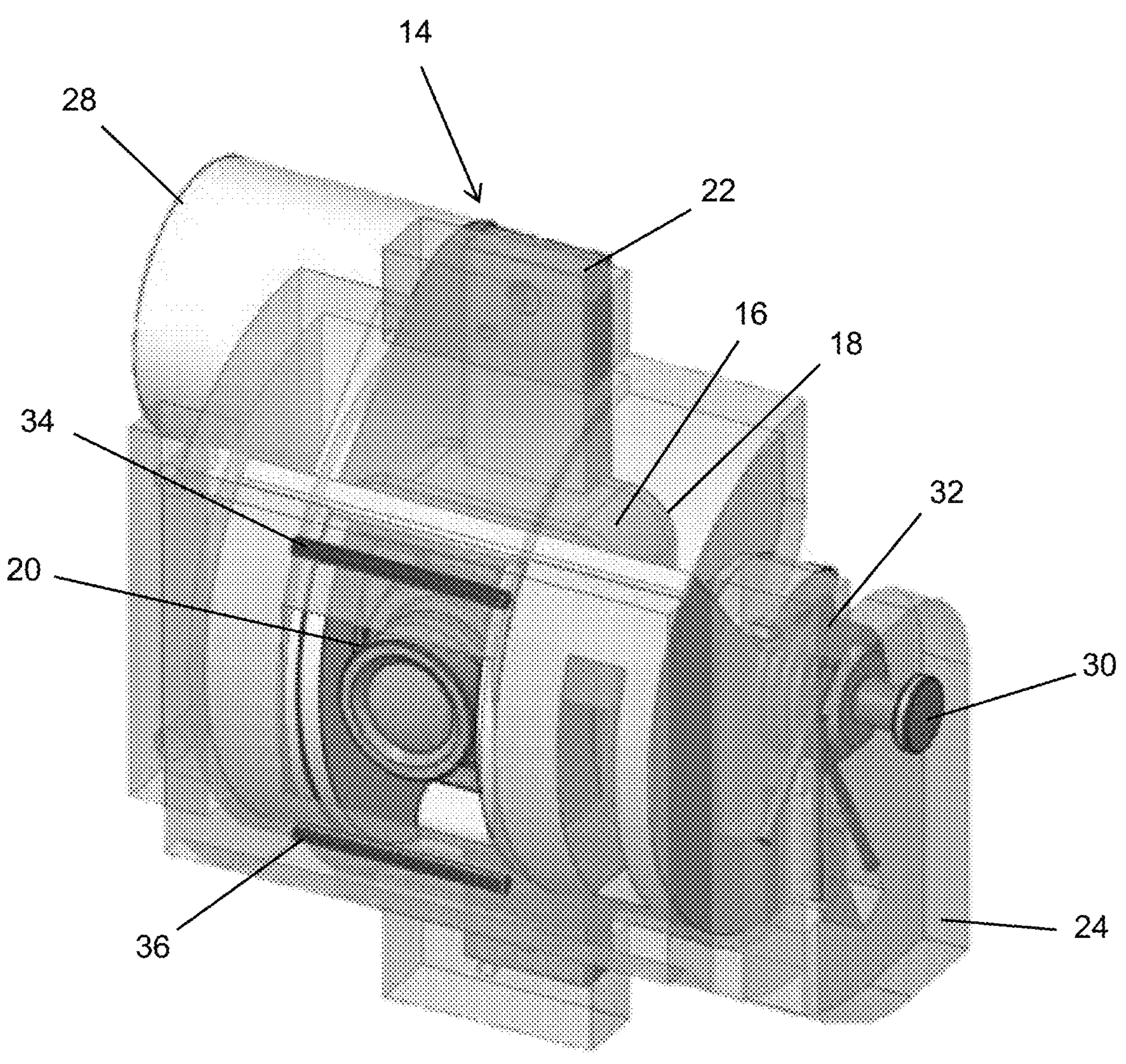
FIG. 2 is a perspective view of a camera module disposed at a mounting assembly with an oscillating camera cleaning system.
Figure 3:
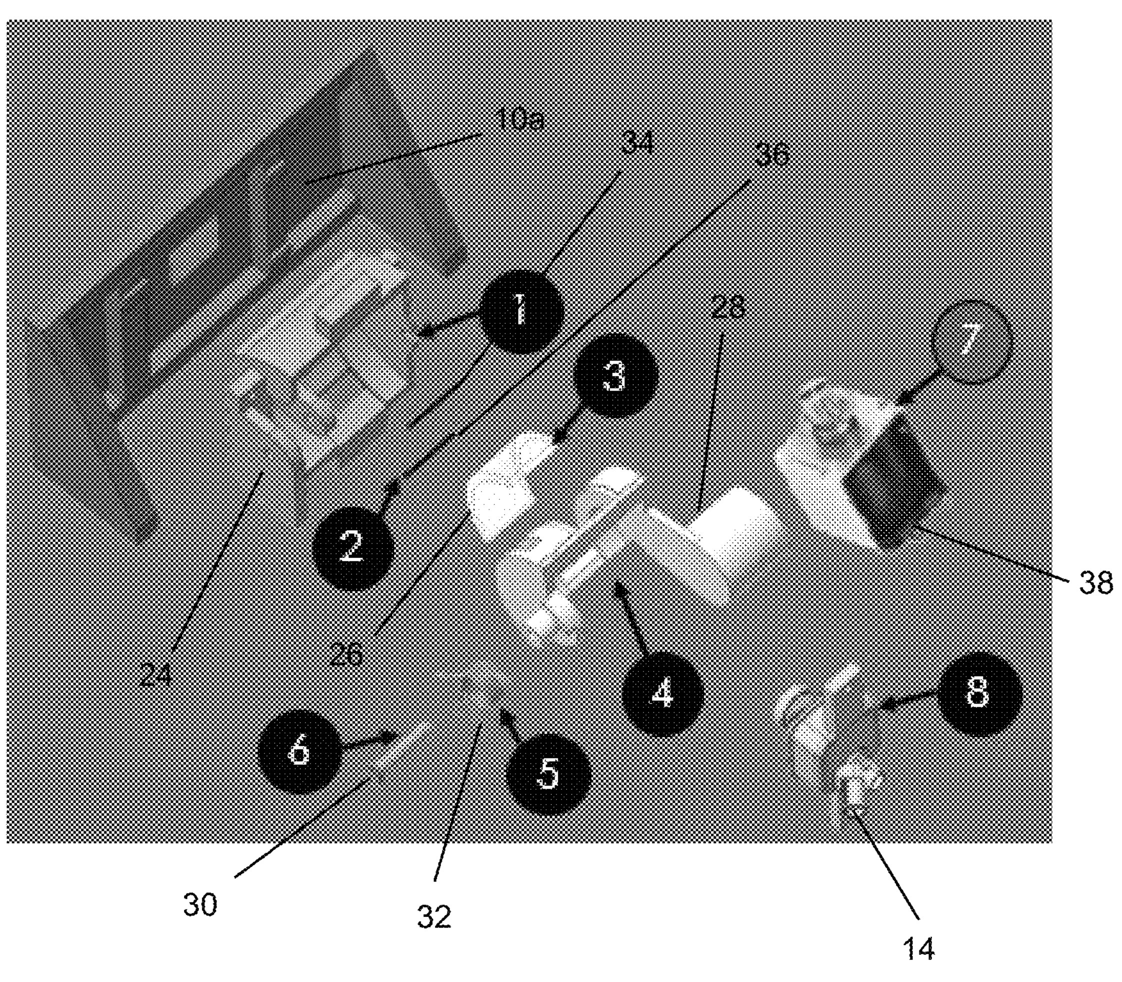
FIG. 3 is an exploded view of the mounting assembly with a solenoid that imparts movement of the oscillating camera cleaning system.
Figure 4:
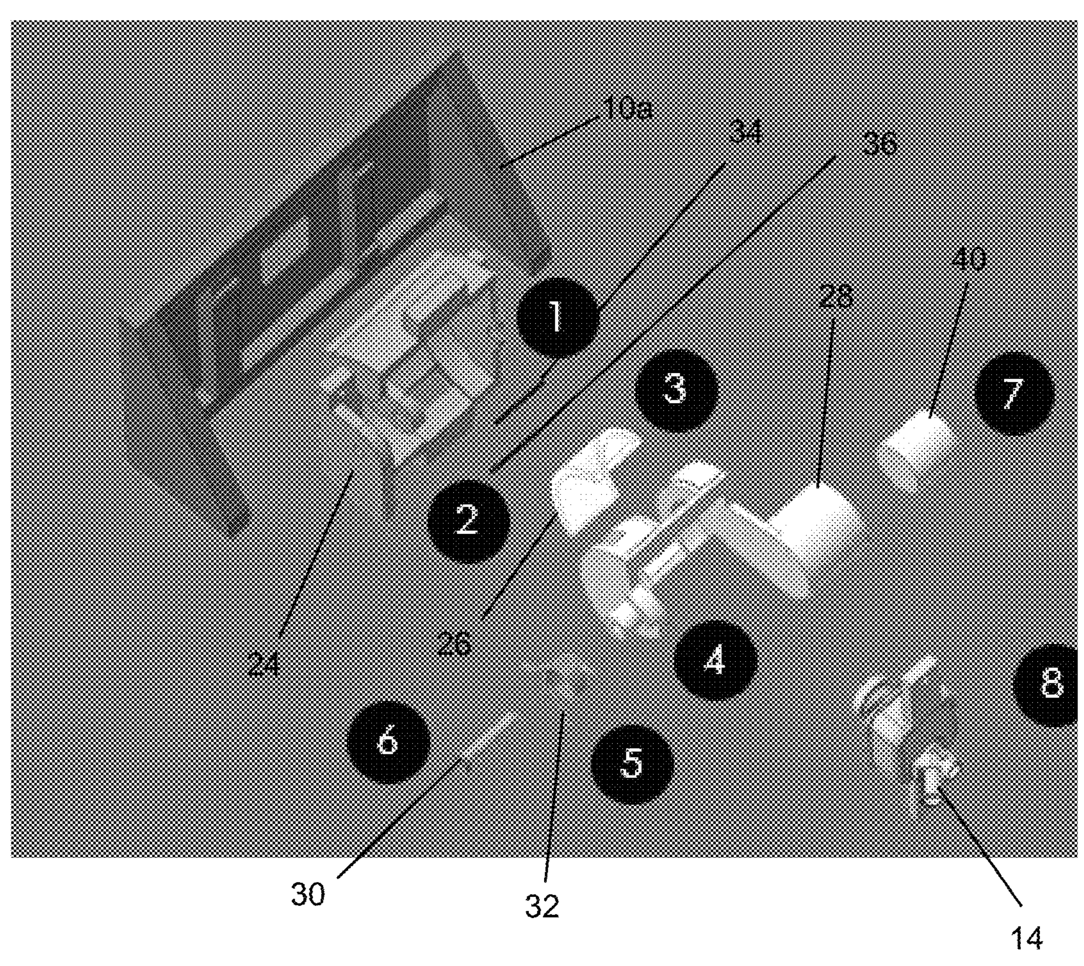
FIG. 4 is an exploded view of the mounting assembly with a counterweight that promotes movement of the oscillating camera cleaning system.
Figure 5:
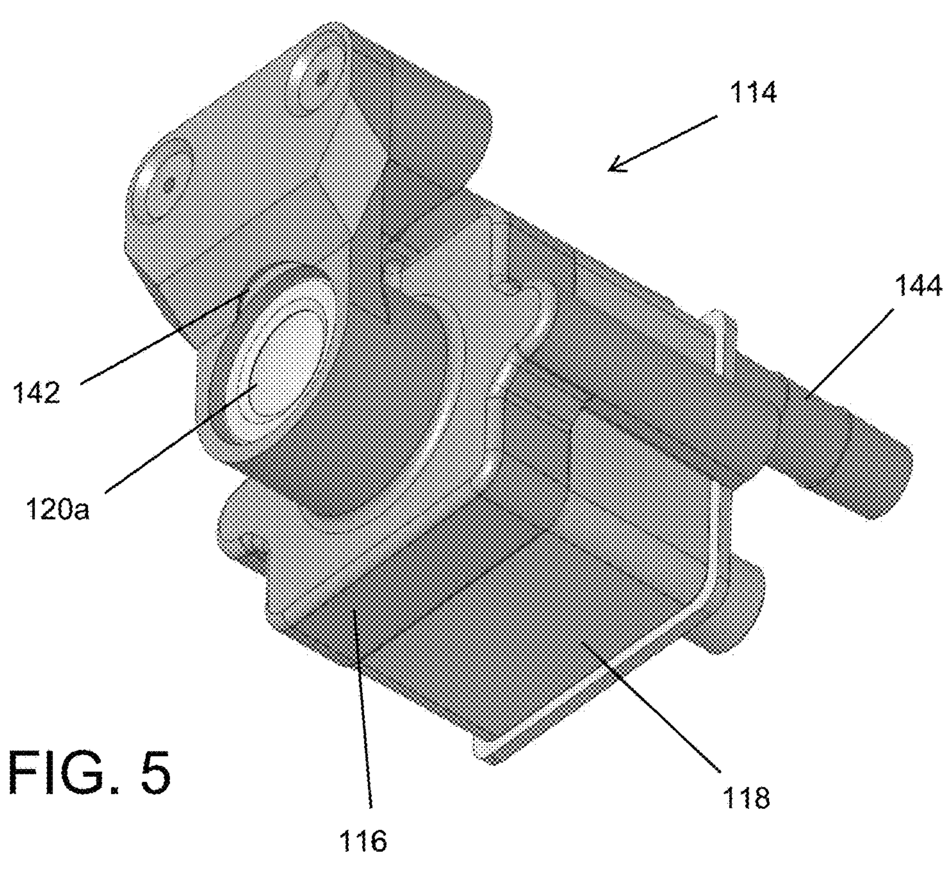
FIGS. 5 and 6 are perspective views of a camera module with a nozzle configured to selectively direct pressurized air or washer fluid at an outermost lens of the camera module.
Figure 6:
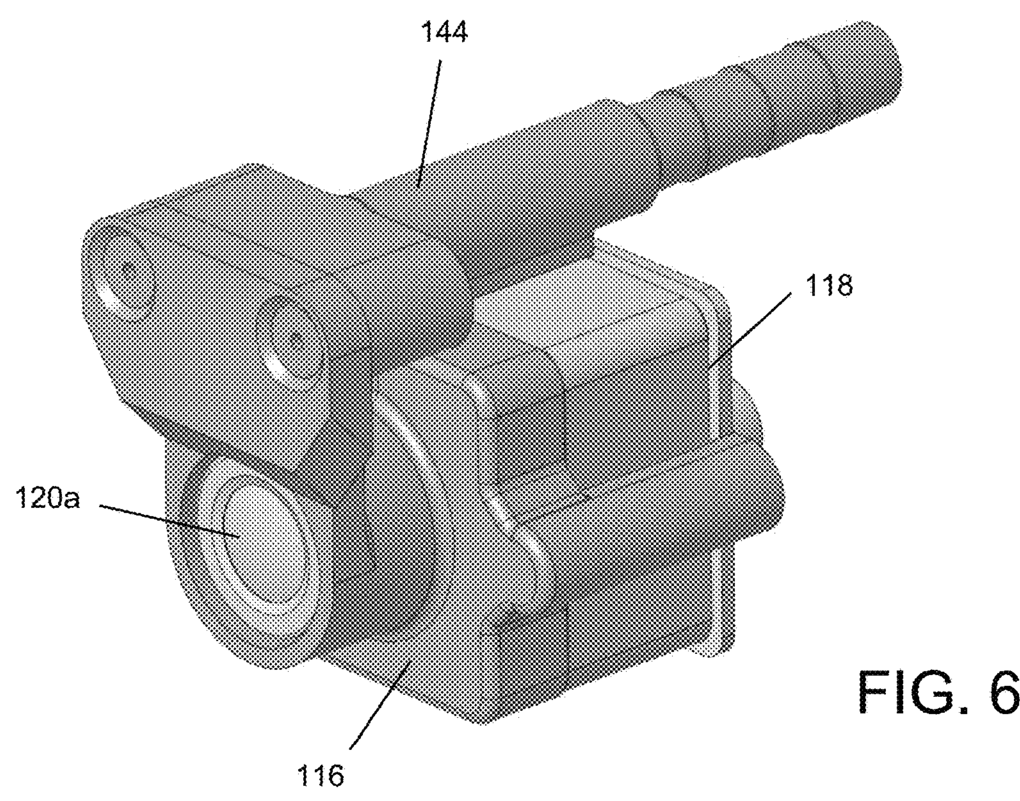
Figure 7:
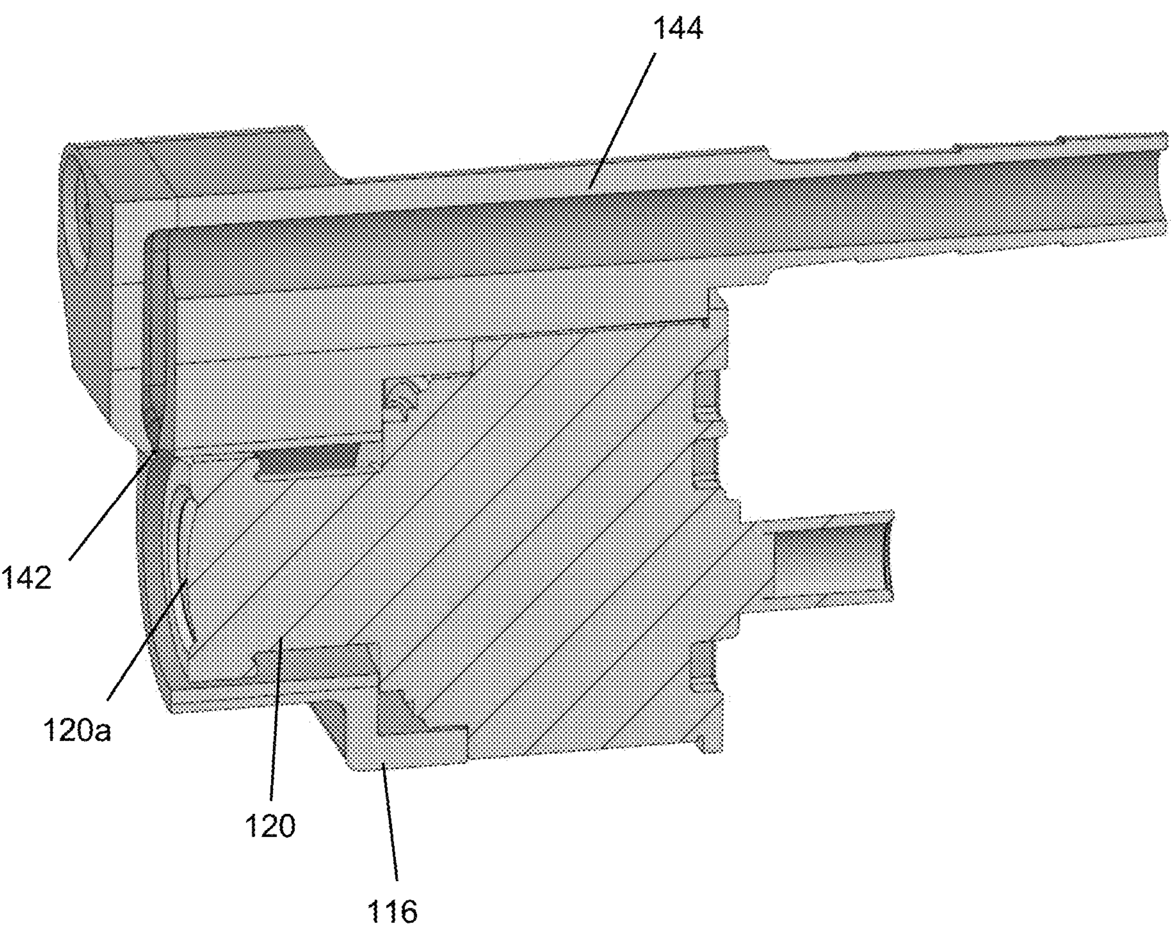
FIG. 7 is a sectional view of the camera module of FIGS. 5 and 6.

Referring to FIGS. 2-4, the camera module 14 includes an imager assembly (not shown) that may include an imager printed circuit board (imager PCB) having an imager disposed at a first side of the imager PCB, and the imager assembly is accommodated by a camera housing. The camera housing includes a first or front housing portion or lens holder 16 and a second or rear housing portion 18 that couple to one another to house the imager PCB at an interior portion of the camera housing. A lens barrel 20 that accommodates a lens or lens assembly (including one or more lens optics or lens elements) is aligned with the imager and is received through an aperture in the front housing portion 16. The camera housing includes one or more attaching flanges 22 that extend from one or both of the front housing portion 16 and the rear housing portion 18 for mounting the camera module 14 at a mounting bracket or base portion or outer housing portion 24 disposed at the vehicle. One or more fasteners, such as threaded fasteners or screws, or an adhesive element, such as an adhesive tape or glue, may couple the attaching flanges to the mounting bracket 24. The camera module may mount at the mounting bracket or other suitable structure at the vehicle, such as by utilizing characteristics of the cameras and attaching flanges described in U.S. Publication No. US-2023-0219500, which is hereby incorporated herein by reference in its entirety.

The mounting bracket 24 is disposed at the vehicle, such as at an inner side or surface of a mounting portion or panel 10*a* of the vehicle 10 (such as at a front bumper, front grille fascia, rear bumper, body panel, and the like), and the camera 14 views through the mounting bracket 24 and the mounting portion 10*a* of the vehicle 10. For example, the lens barrel 20 of the camera 14 may be aligned with an aperture of the mounting bracket 24 and an aperture formed through the mounting portion 10*a* of the vehicle 10.

A clear or transparent outer lens or cover element 26 is movably disposed at the mounting bracket 24 and in front of the lens barrel 20. The outer lens 26 is exposed exterior of the vehicle to preclude contaminants and/or moisture from dirtying or occluding an outer lens element of the lens barrel 20. For example, the outer lens 26 is disposed over the aperture in the mounting bracket 24 at an inner surface of the mounting bracket and between the camera module 14 and the mounting bracket 24 so that a first or outer surface or side of the outer lens 26 faces the inner surface of the mounting bracket 24 and exterior the vehicle and a second or inner surface or side of the outer lens 26 faces the lens barrel 20 of the camera module 14.

The outer lens 26 comprises an arcuate or curved or convex or at least partially cylindrical shape or profile that conforms to a correspondingly shaped inner surface of the mounting bracket 24 so that the outer lens 26 substantially conforms to the shape of the aperture of the mounting bracket 24. Put another way, the shape of the outer lens 26 is substantially similar to the shape of the mounting bracket to provide a substantially watertight engagement at the aperture between the inner surface of the mounting bracket 24 and the outer lens 26, and/or to prevent large gaps between the mounting bracket 24 and the outer lens 26 through which water and/or contaminants could intrude into the vehicle. The outer lens 26 is pivotably mounted relative to the mounting bracket 24 via a pivotable swing housing or inner housing portion 28. The swing housing 28 is pivotably mounted to the mounting bracket 24 via a pin 30 that extends through the mounting bracket 24 and swing housing 28 and defines a pivoting axis of the assembly. The swing housing 28 comprises an arcuate or cylindrical shape that corresponds to the shape of the outer lens 26 and the inner surface of the mounting bracket 24 so that the swing housing 28 and outer lens 26 may pivot together and in tandem relative to the mounting bracket 24. Thus, the swing housing 28 and outer lens 26 are disposed in front of the camera module 14 (i.e., between the camera module and mounting bracket).

A biasing element 32, such as a torsion spring, is disposed along the pin 30 and engages the mounting bracket 24 and the swing housing 28 to bias the swing housing 28 about the pivoting axis toward a position where the outer lens 26 is disposed between the lens barrel 20 and the aperture in the mounting bracket 24 (e.g., an outer facing position). Thus, and as described further below, if the swing housing 28 and outer lens 26 are pivoted relative to the mounting bracket away from the outer facing position, the biasing element 32 urges the swing housing 28 and thus outer lens 26 back toward the outer facing position.

One or more wiping elements 34 comprising, for example, a rubber or other flexible material, are disposed between the mounting bracket 24 and the outer lens 26 and swing housing 28 so that, as the swing housing 28 and outer lens 26 pivot relative to the mounting bracket 24, the one or more wiping elements engage and move at least partially along the outer surface of the outer lens 26 to remove moisture and/or contaminants from the outer lens 26. For example, a first wiping element 34 may be disposed at the inner surface of the mounting bracket and along an upper edge region of the aperture of the mounting bracket 24 so that, as the swing housing 28 and the outer lens 26 pivot relative to the mounting bracket 24 in a first direction (e.g., clockwise in FIGS. 3 and 4), the first wiping element 34 engages an upper region of the outer lens 26 and the outer lens 26 pivots to move the first wiping element 34 toward a lower region of the outer lens 26. Similarly, a second wiping element 36 may be disposed along a lower edge region of the aperture of the mounting bracket 24 so that, as the swing housing 28 and the outer lens 26 pivot relative to the mounting bracket 24 in an opposite second direction (e.g., counterclockwise in FIGS. 3 and 4), the second wiping element 36 engages the lower region of the outer lens 26 and the outer lens 26 pivots to move the second wiping element 36 toward the upper region of the outer lens 26. The biasing element 32 urges the swing housing 28 and outer lens 26 toward the forward facing position.

As shown in FIG. 3, the swing housing 28 and outer lens 26 may be actively pivoted relative to the mounting bracket 24 via an electrically operable motor or solenoid 38 coupled to the swing housing 28. The solenoid 38, in response to an input, is electrically operated and imparts pivotal movement of the swing housing 28 about the pivot axis of the pin 30 to clean the outer lens 26. For example, the solenoid 38 pivots the swing housing 28 in response to a user input at the interior portion of the vehicle, or in response to a determination at the ECU 18 via processing of image data captured by the camera 14 that the outer lens 26 is dirty or at least partially occluded. Optionally, the solenoid 38 may be energized automatically, such as upon vehicle startup or at a regular time interval, to maintain a clean and clear outer lens 26. The solenoid 38 may be configured to pivot the outer lens 26 in both the first and second directions, or in just one of the first direction or the second direction. The biasing element 32 biases the swing housing 28 and outer lens 26 back toward the default or outer facing position after activation of the solenoid 38. Thus, the spring and solenoid swing system actively cleans the camera's optical path in an oscillating motion on demand.

As shown in FIG. 4, the swing housing 28 and outer lens 26 may be passively pivoted relative to the mounting bracket 24, such that the swing housing 28 pivots relative to the mounting bracket 24 based on forces experienced by the swing housing 28 relative to the fixed mounting bracket 24. For example, the swing housing 28 may pivot relative to the mounting bracket 24 based on acceleration and deceleration of the vehicle or when the vehicle travels over bumps or ascends or descends hills. A counterweight 40 may be coupled to the swing housing 28 such as at a portion of the swing housing 28 radially opposing the outer lens 26, to balance the biasing force of the biasing element 32 and promote movement of the swing housing 28 relative to the mounting bracket 24. The biasing element 32 biases the swing housing 28 and outer lens 26 back toward the default or outer facing position. Thus, the spring and mass swing system passively cleans the camera's optical path in an oscillating motion that is prompted, for example, by bumps, acceleration, and deceleration of the vehicle.

Optionally, the assembly may be configured to provide both passive and active cleaning. For example, when the solenoid 38 is not electrically operated to pivot the swing housing 28, the swing housing 28 may be free to pivot relative to the mounting bracket 24 to passively clean the outer lens 26 and the counterweight or mass 40 coupled to the swing housing 28 promotes such pivotal movement based on the forces at the swing housing 28. When the solenoid 38 is electrically operated, the solenoid pivots the swing housing 28 to actively clean the outer lens 26. The solenoid 38 may disengage from, or otherwise not be engaged with, the swing housing 28 when the solenoid 38 is not being electrically operated.

The outer lens 26 may be configured to provide coverage for the aperture even when the outer lens 26 and swing housing 28 are pivoted to clean the outer lens 26. For example, the outer lens 26 may include a first or main viewing portion, where the first portion is disposed over the aperture in the mounting bracket 24 when the outer lens 26 is in the forward facing position and the camera module 14 views through the first portion. A second or lower portion extends from the main viewing portion and toward the lower edge region of the aperture of the mounting bracket 24 so that when the outer lens 26 and swing housing 28 pivot in the first direction (e.g., clockwise in FIGS. 3 and 4), the lower portion moves toward the aperture and the camera module may view through the lower portion. A third or upper portion extends from the main viewing portion and toward the upper edge region of the aperture of the mounting bracket 24 so that when the outer lens 26 and swing housing 28 pivot in the second direction (e.g., counterclockwise in FIGS. 3 and 4), the upper portion moves toward the aperture and the camera module may view through the upper portion. Thus, the outer lens 26 provides continuous protection from contaminants and moisture for the camera module and a cost effective, low component count solution that does not mechanically block the optical path of the camera during cleaning of the outer lens 26.

Furthermore, a cleaning system including a spraying device for washing or rinsing dry contaminants from the lens may be mounted at or near the camera assembly for dispensing water or a cleaning solution onto the outer lens prior to or while the swing housing pivots relative to the mounting bracket. For example, the camera assembly may utilize characteristics of the cameras and cleaning systems described in U.S. Pat. Nos. 11,140,301; 10,604,121; 10,399,509 and/or 9,707,896 and/or U.S. Publication Nos. US-2022-0263990; US-2020-0275004; US-2016-0272163 and/or US-2018-0361998 and/or U.S. patent application Ser. No. 18/494,999, filed Oct. 26, 2023, now U.S. Pat. No. 12,563,280, which are all hereby incorporated herein by reference in their entireties.

Optionally, the camera module may include or be coupled to a cleaning system that washes and dries the optical surface (e.g., the outer most optic element of the lens assembly or the outer transparent lens), so as to not be optically disruptive. That is, the cleaning system does not affect the optical design of the camera module.

For example, and referring to FIGS. 5-9, a camera module 114 includes a first or front camera housing portion or lens holder 116 and a second or rear camera housing portion 118 that couples to the front housing 116 to house the imager PCB at an interior portion of the camera housing. A lens barrel 120 that accommodates a lens or lens assembly (including one or more lens optics or lens elements) is received through an aperture in the front housing portion 116. An outermost lens element 120*a* is disposed at an outer end of the lens barrel 120 and the outermost lens element 120*a* may have an outer surface that is exposed exterior the vehicle.

A dual purpose nozzle or outlet 142 is disposed at the camera module 114 and pointed or directed at the outer surface of the outermost lens element 120*a* so that, when pressurized fluid is directed through the nozzle 142, the pressurized fluid cleans the outermost lens element 120*a*. The nozzle 142 is configured to direct pressurized water or cleaning fluid toward the outermost lens 120*a* to wash away contaminants, and the nozzle 142 is configured to direct pressurized air toward the outermost lens 120*a* to dry the lens. As shown, the nozzle 142 is positioned at an upper portion of the outermost lens 120*a* to direct the water or cleaning solution and air downward and inward toward the outermost lens 120*a*. Thus, the dual purpose nozzle 142 may provide a single outlet configured to direct both water and air at the outermost lens 120*a*. The nozzle 142 may be integrally formed with or part of the front housing 116, or the nozzle 142 may comprise a separate component coupled to the camera housing.

The nozzle 142 may be configured to receive the pressurized water and air from separate supply channels or from a universal or shared supply channel. In the illustrated example, a universal or shared supply channel 144 is coupled to the nozzle 142 and configured to selectively supply pressurized water or cleaning solution and pressurized air to the nozzle 142. The supply channel 144 is coupled to the nozzle and extends from the nozzle 142 and along an upper portion of the camera module 114. The supply channel 144 may be a compact channel for flexible styling and packaging options. The nozzle 142 may have a smaller inner diameter than the supply channel 144 to pressurize the fluid directed at the outermost lens 120*a*.

Figure 8:
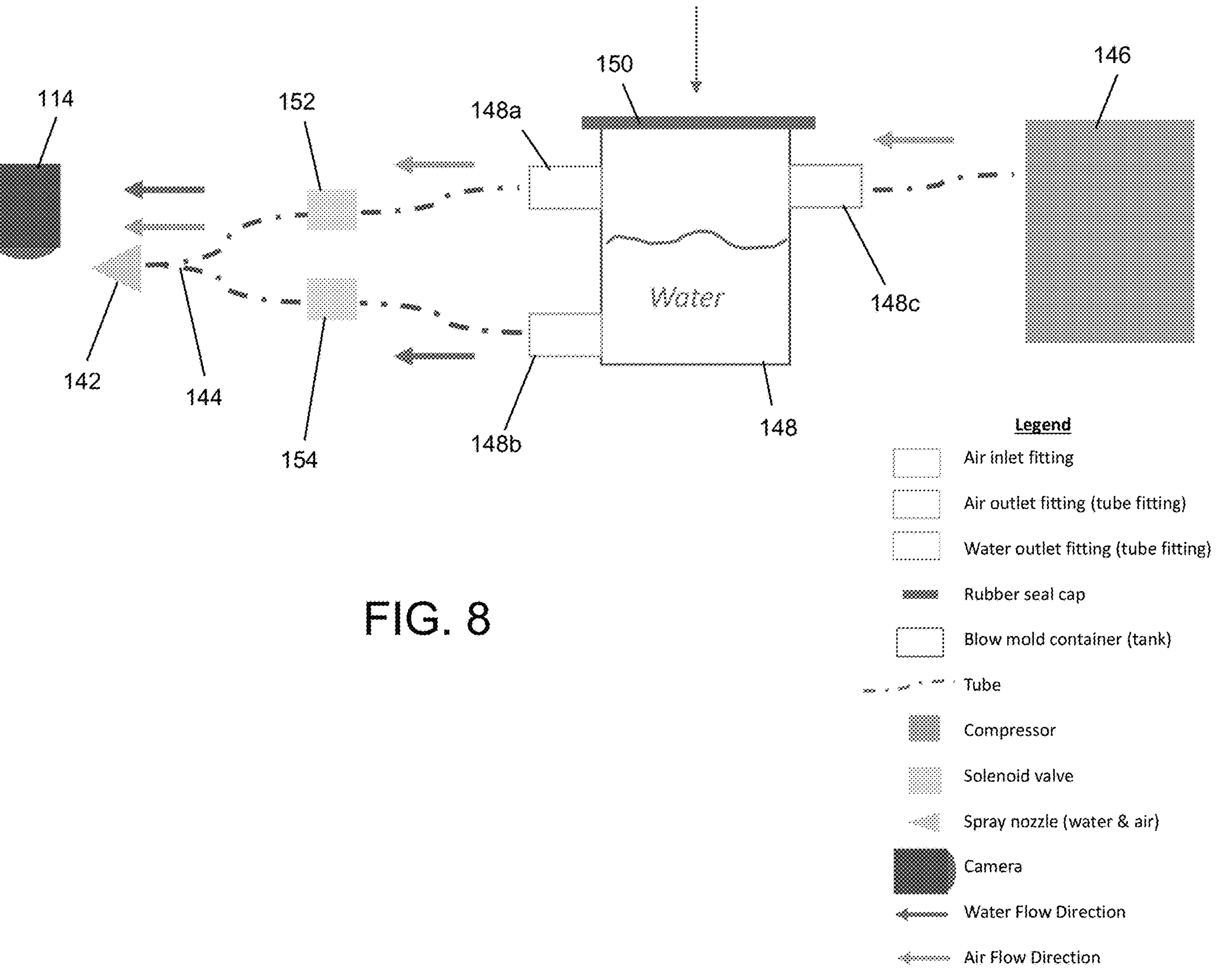
FIG. 8 is a schematic view of the camera cleaning system that selectively provides the pressurized air or washer fluid to the nozzle.
Figure 9:
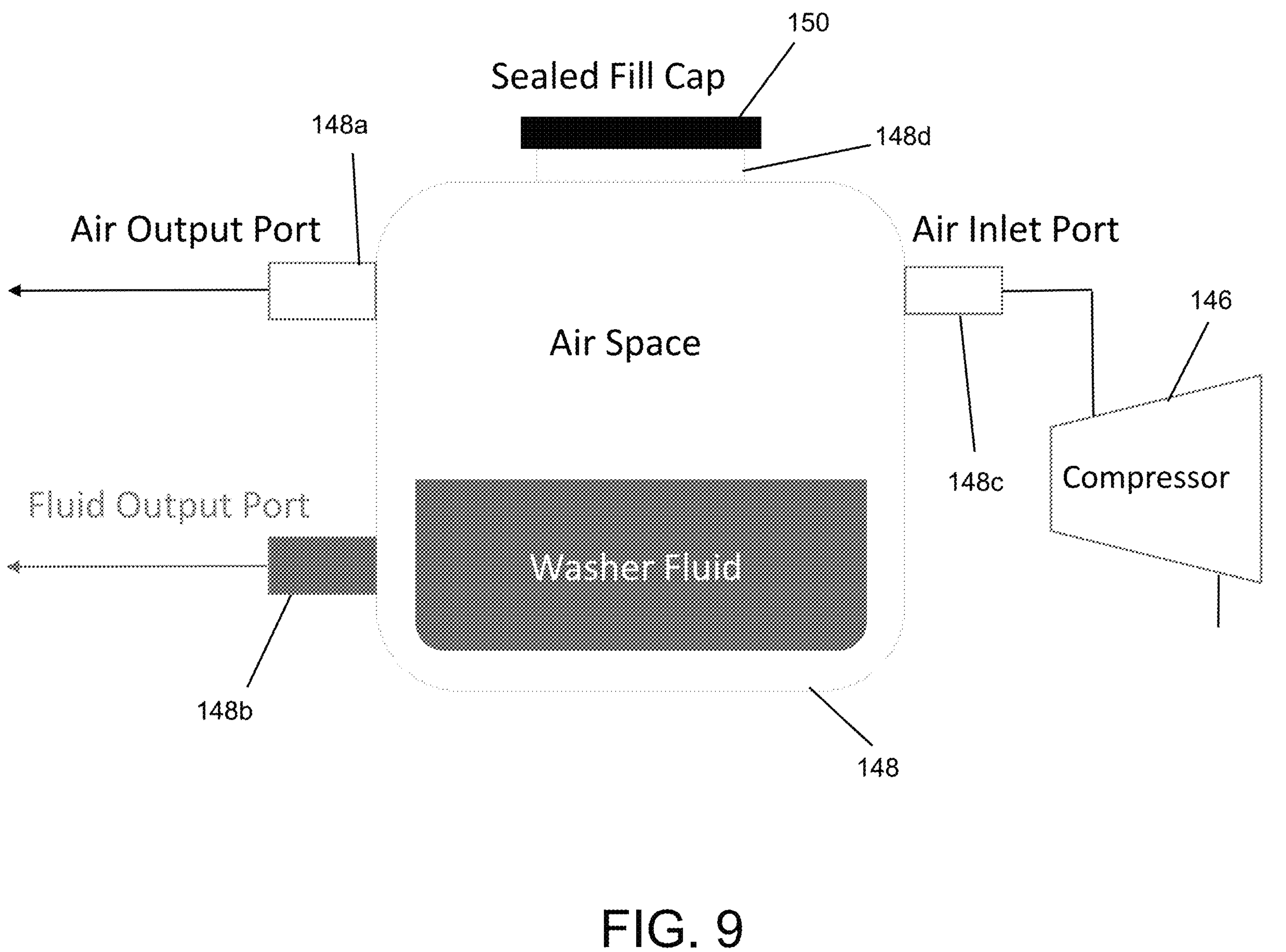
FIG. 9 is a schematic view of the reservoir of the camera cleaning system of FIG. 8.
Figure 10:
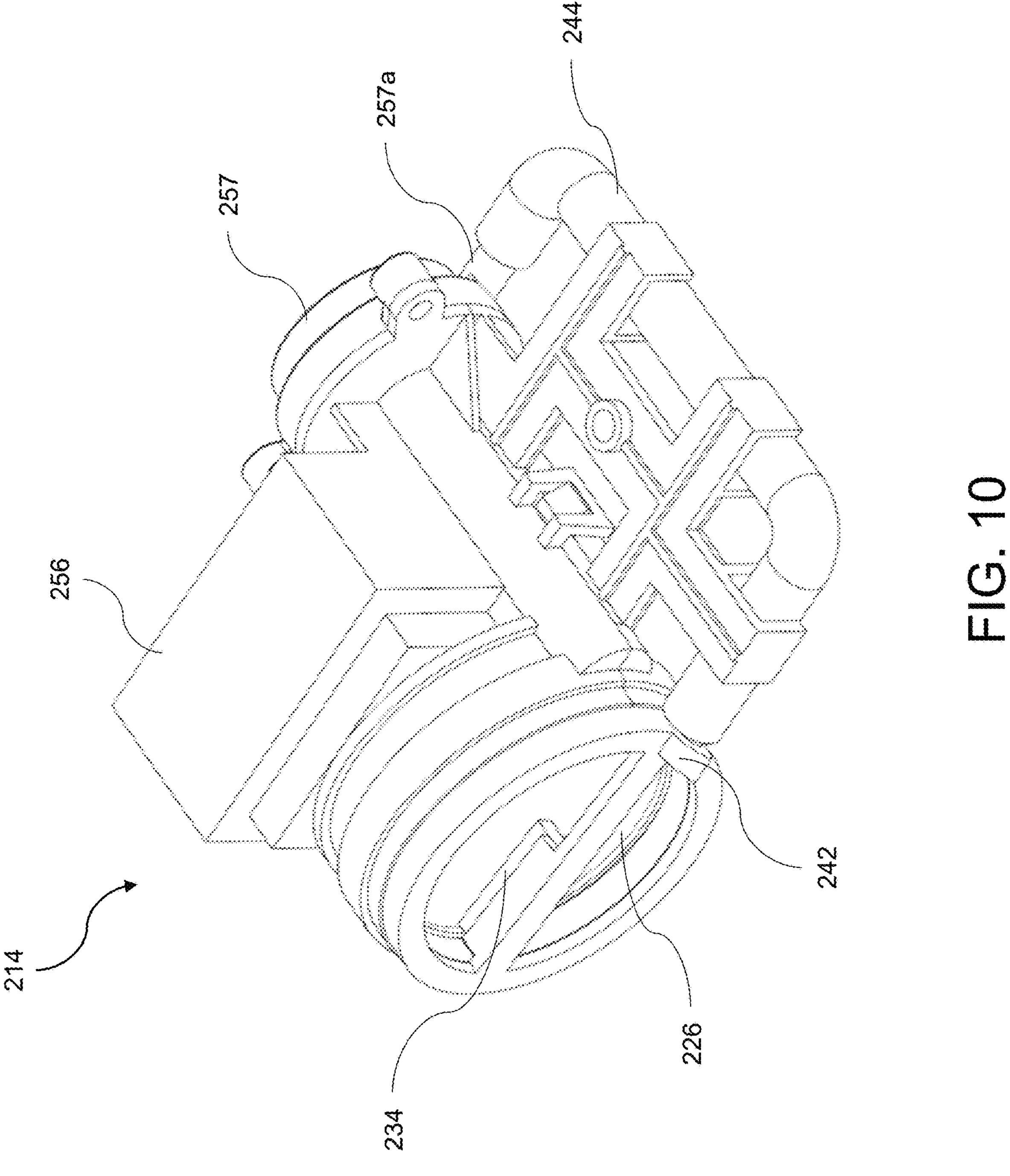
FIGS. 10-27 are views of a camera module with a transparent outer lens that is rotatably driven by pressurized washer fluid.
Figure 11:
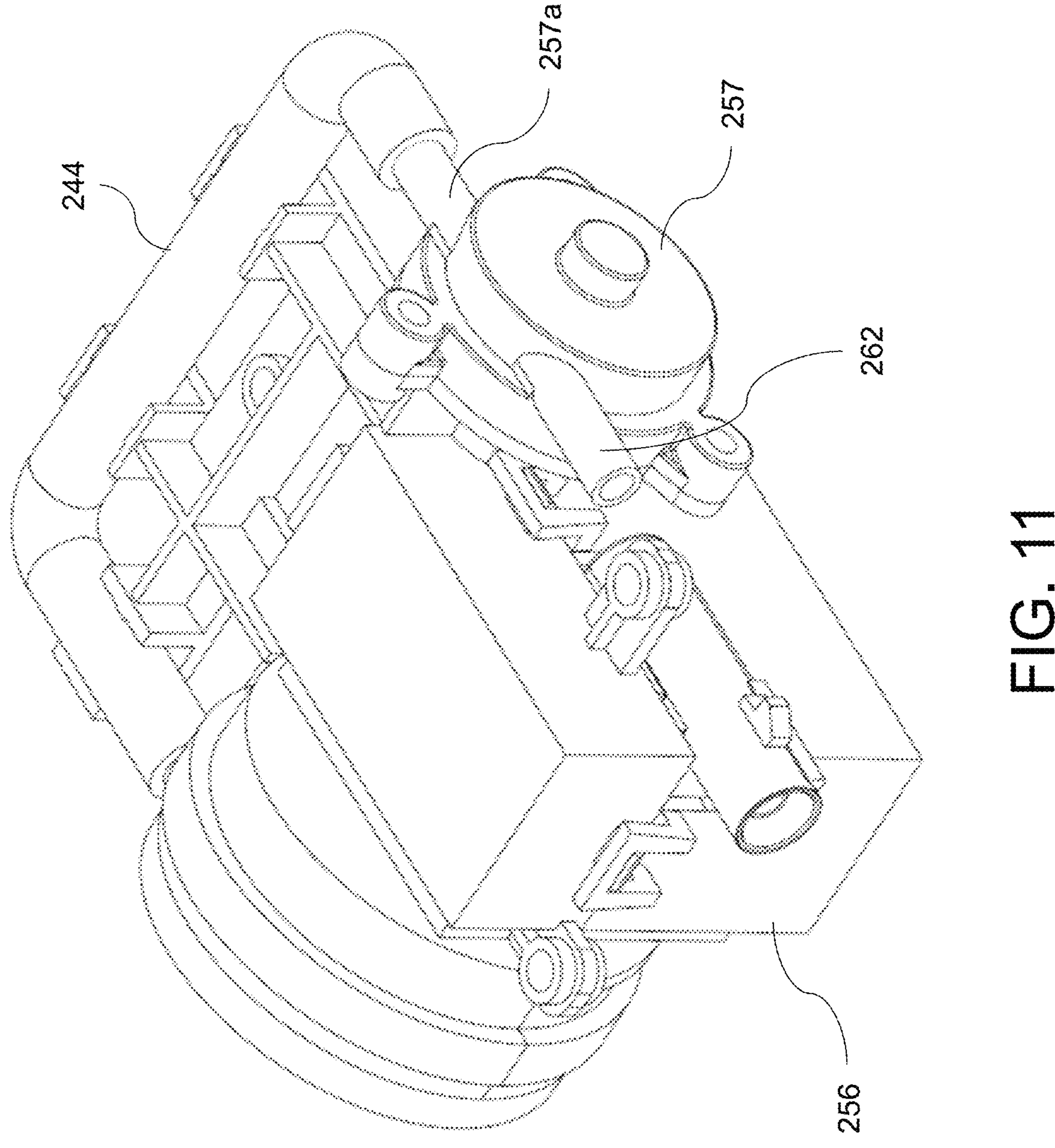
Figure 12:
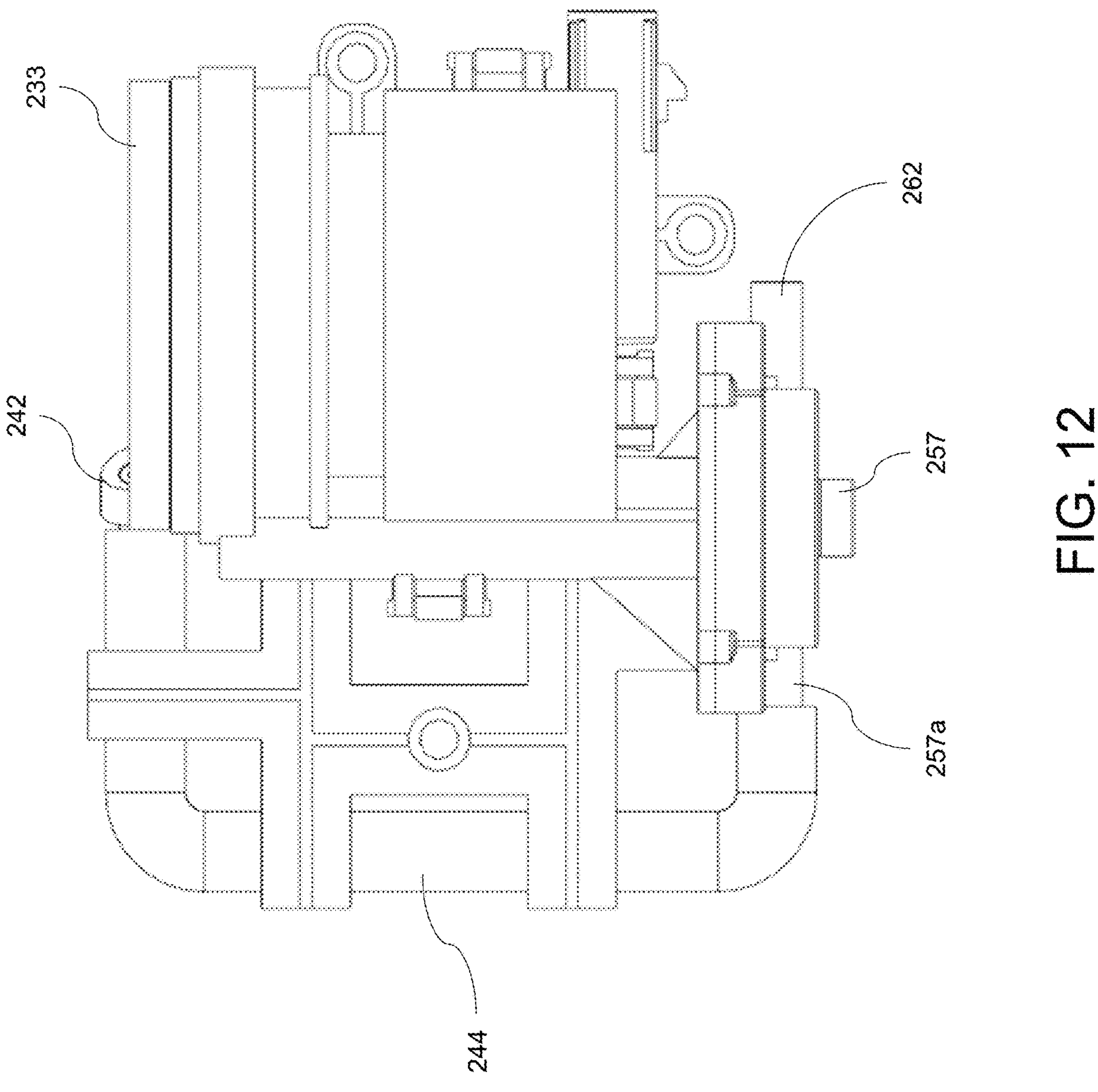
Figure 13:
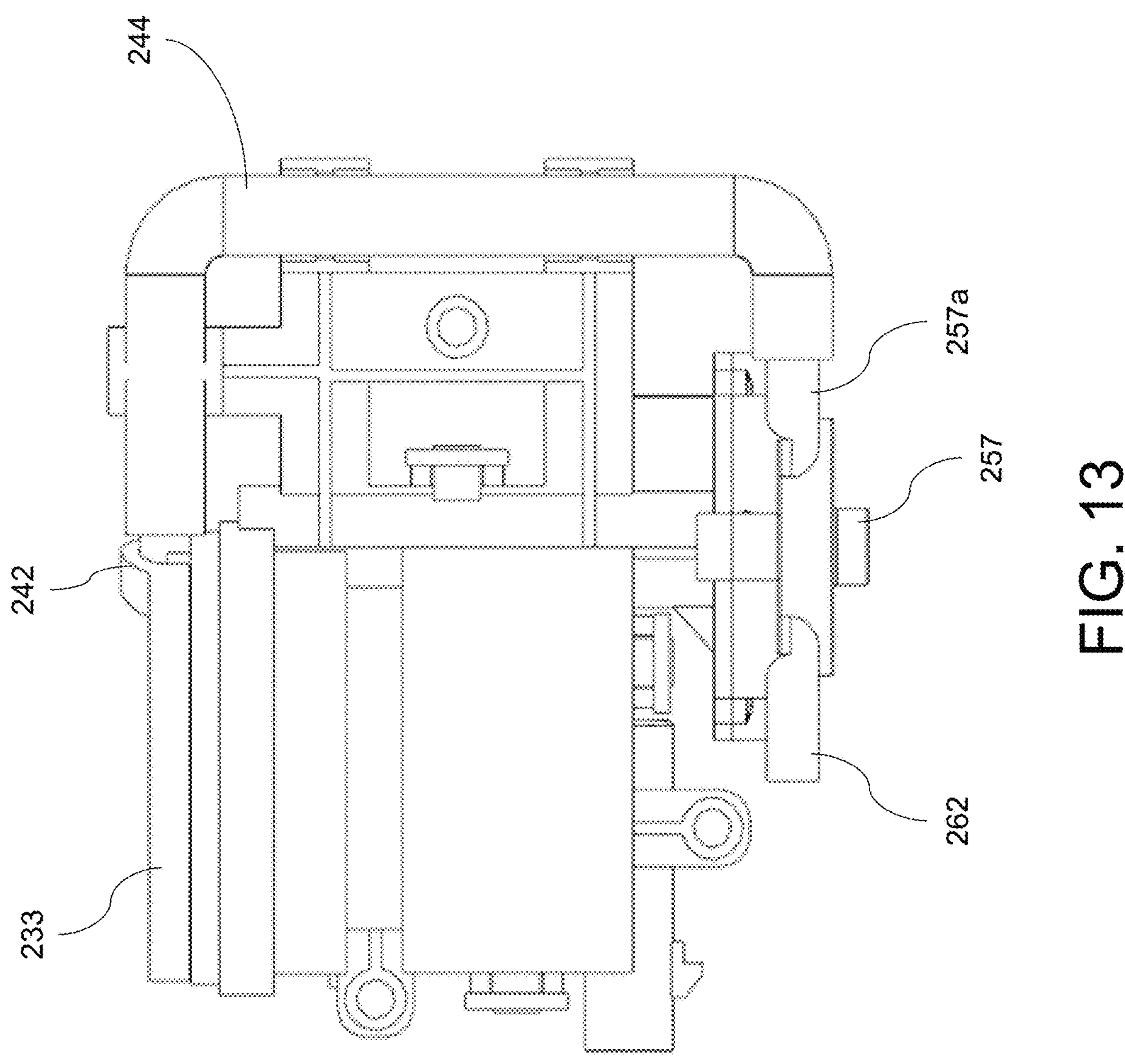
Figure 14:
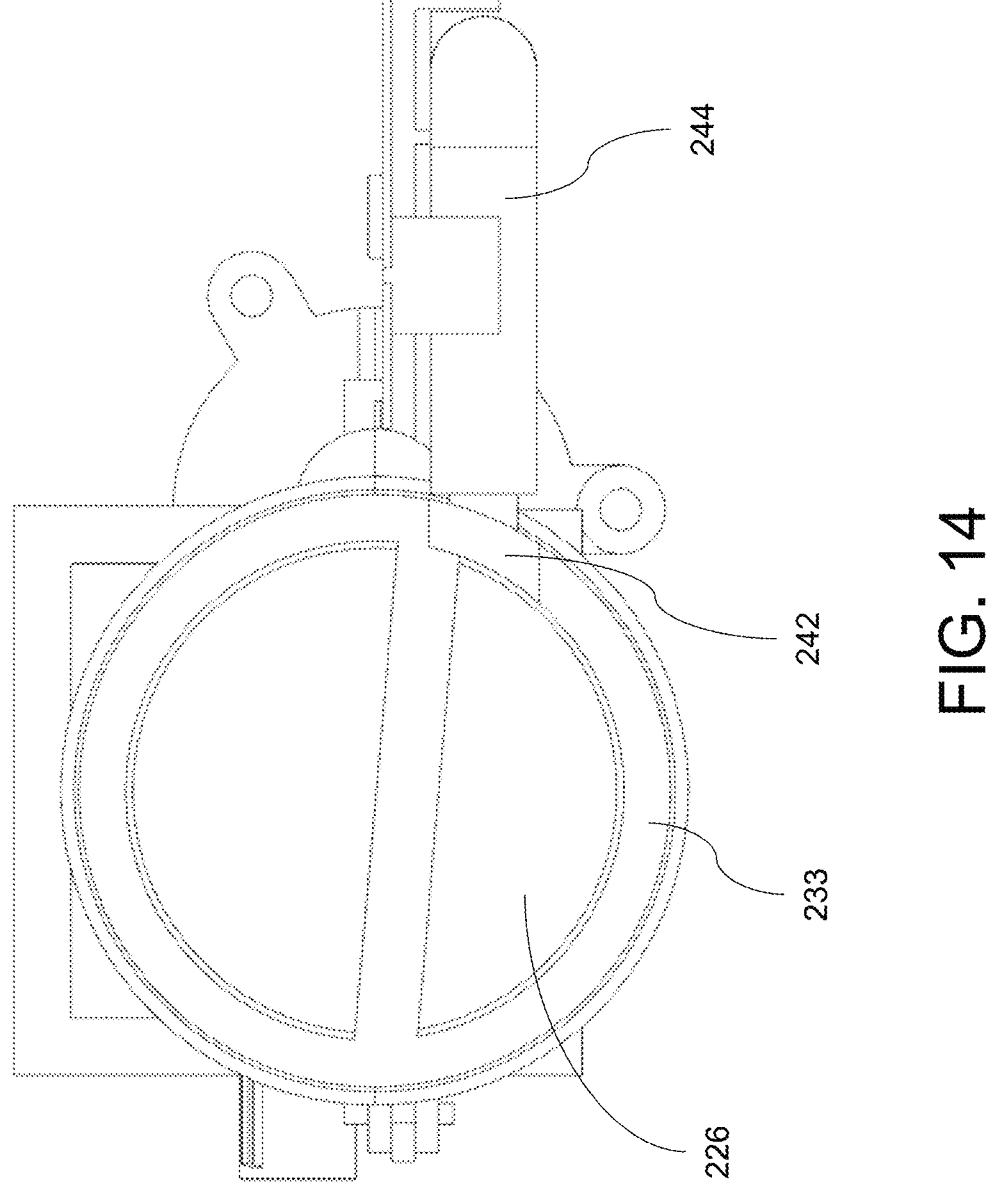
Figure 15:
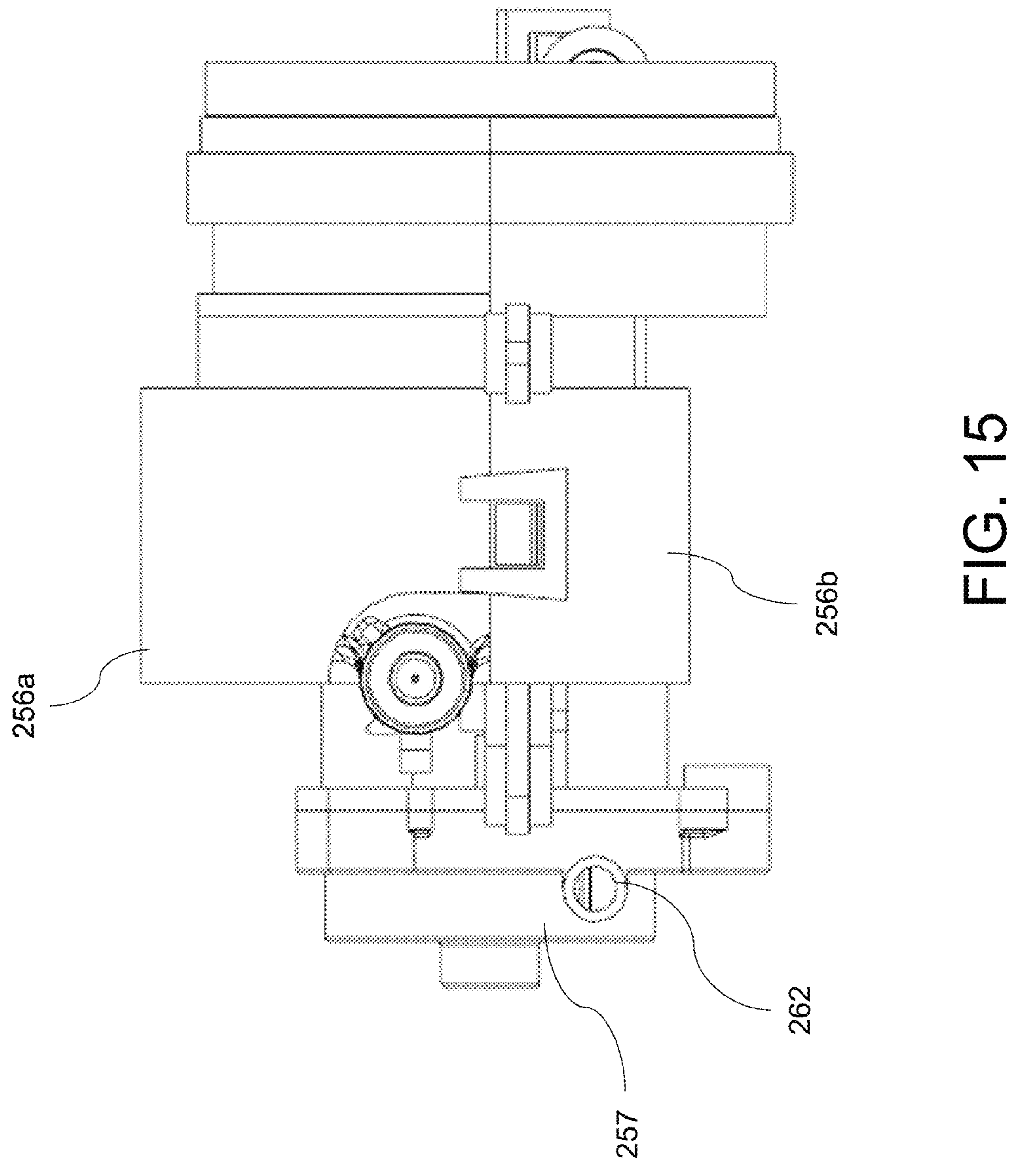
Figure 16:
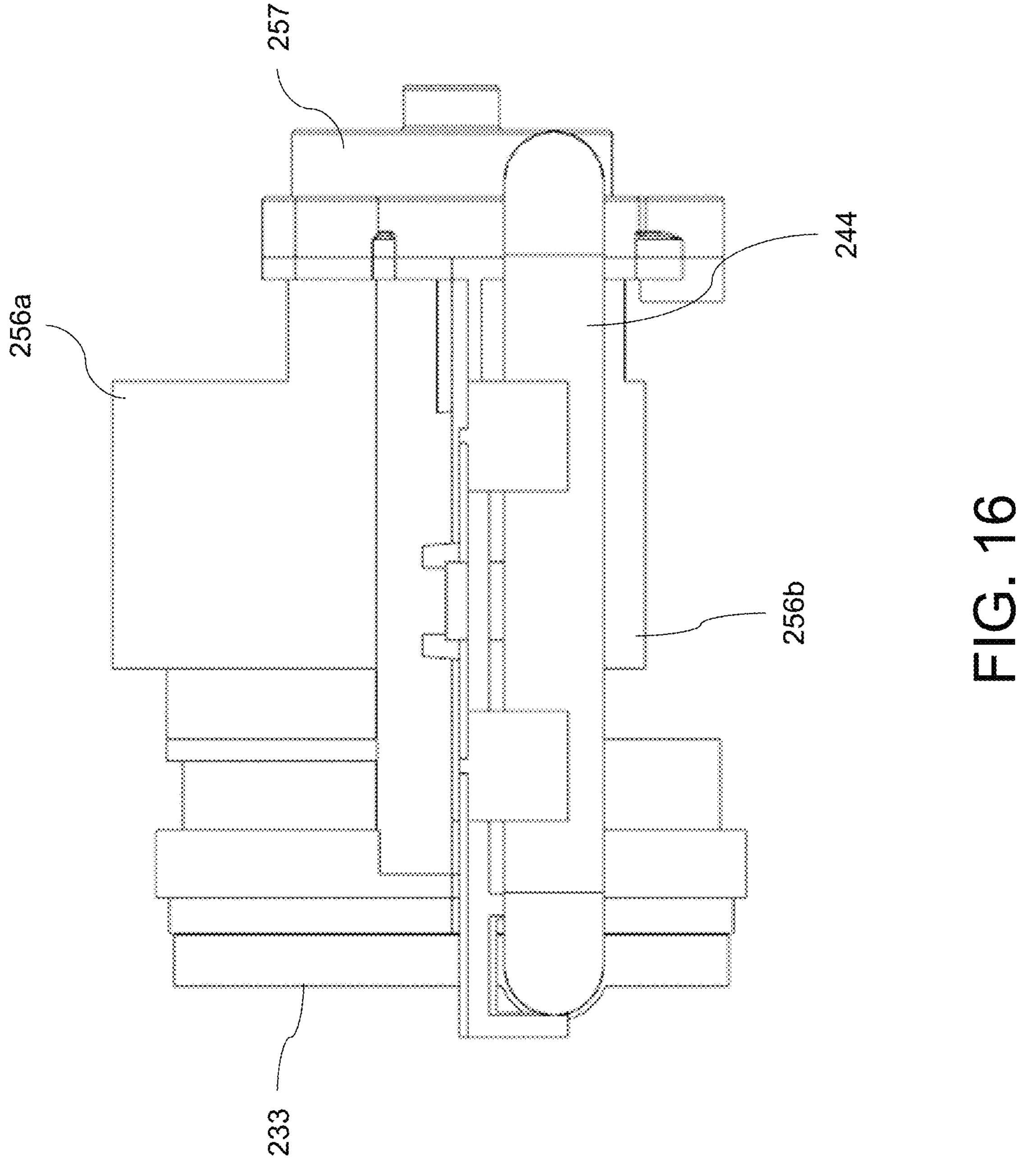
Figure 17:
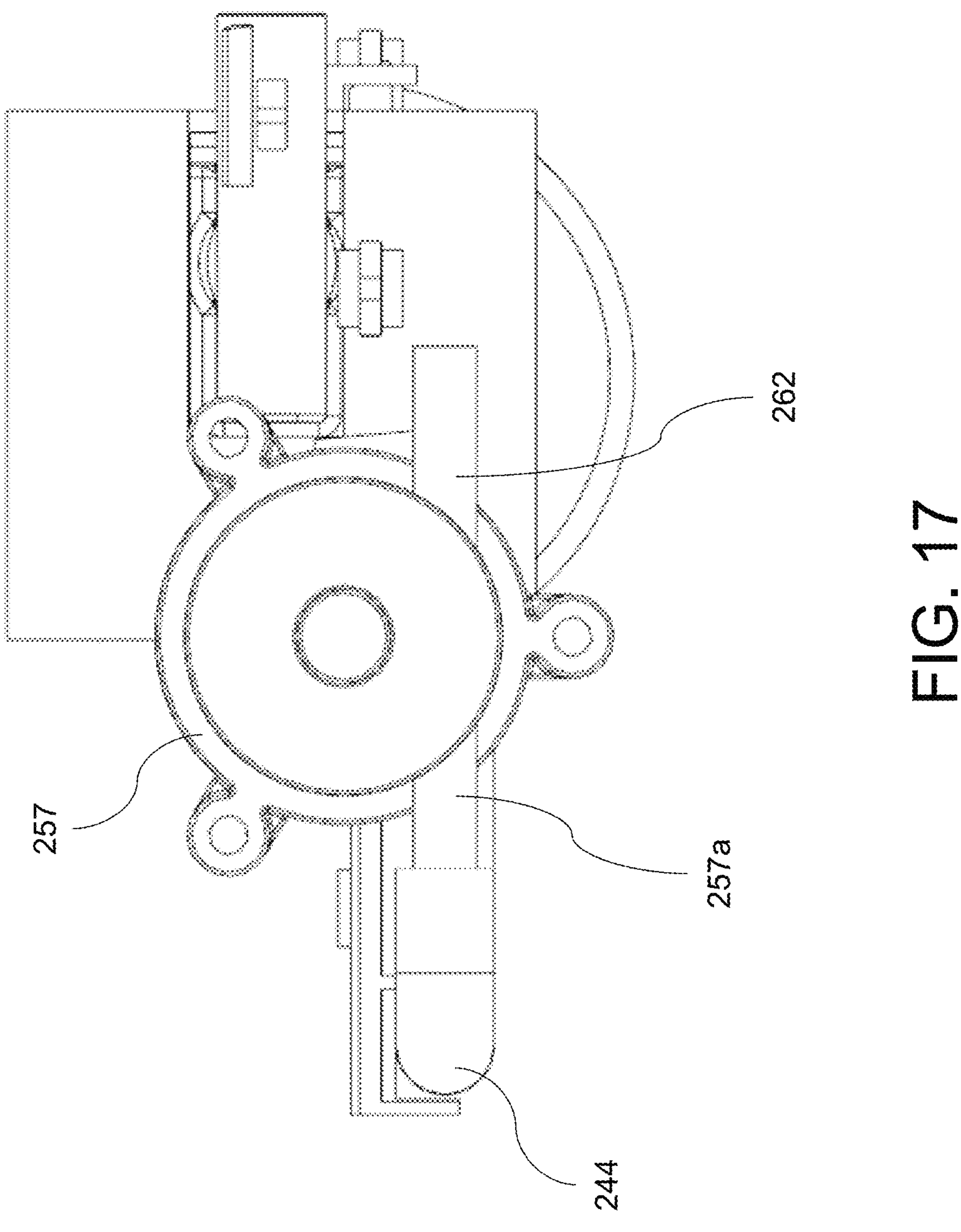
Figure 18:
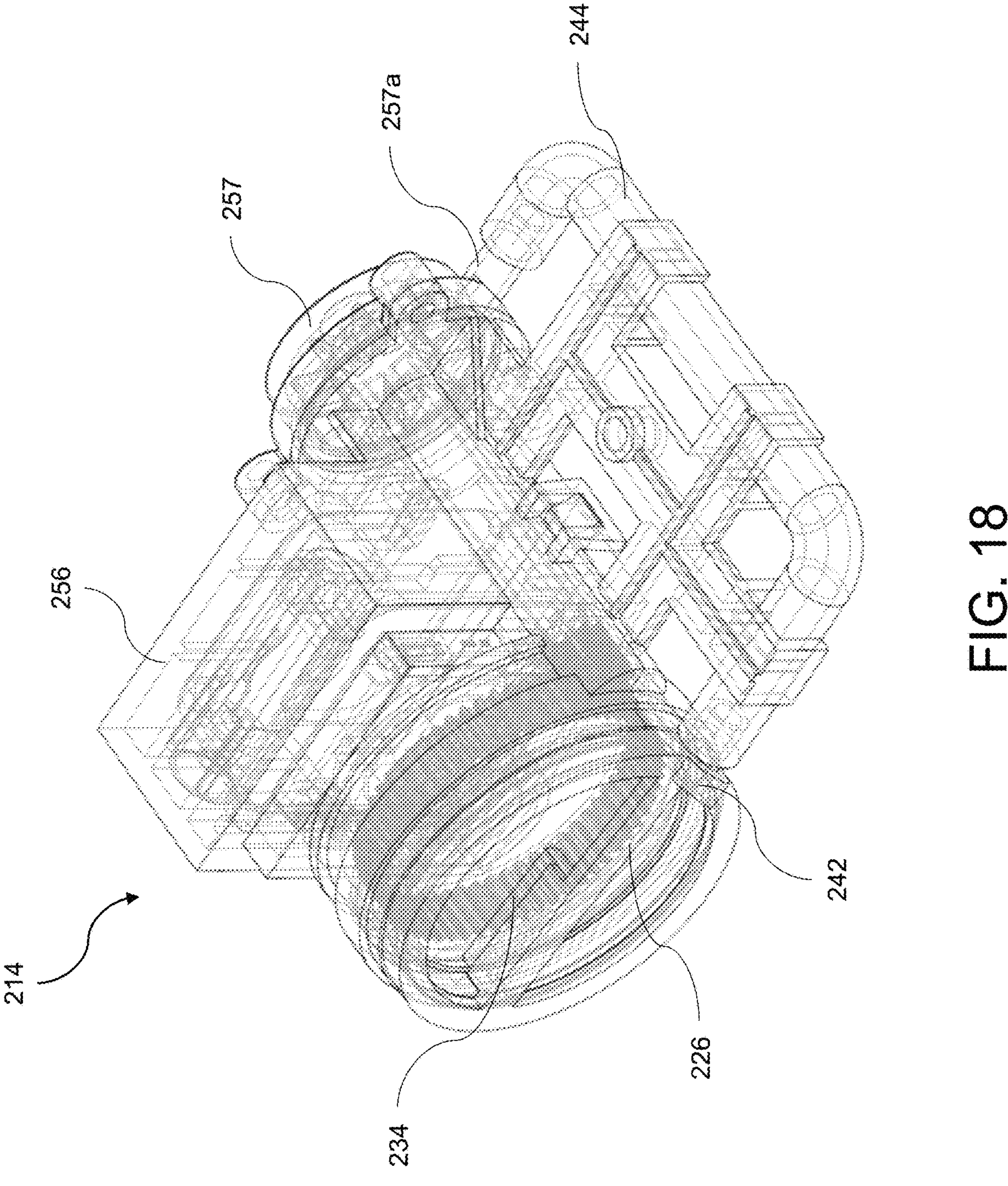

As shown in FIGS. 8 and 9, the cleaning system includes a compressor 146 that is coupled to a reservoir or tank 148 and that, when electrically operated, pressurizes the tank 148. The tank 148 includes a first outlet 148*a* configured to supply pressurized air to the supply channel 144 and a second outlet 148*b* configured to supply pressurized water or cleaning solution to the supply channel 144. For example, the reservoir 148 may include first and second portions or chambers that respectively accommodate reserves of air and water or cleaning solution. Optionally, the reservoir 148 may have a single chamber with the first outlet 148*a* disposed above the second outlet 148*b* so that, with the water or cleaning solution filled to a level between the first and second outlets, the first outlet 148*a* will supply the air and the second outlet 148*b* will supply the water or cleaning solution. The reservoir 148 may include one or more air inlet ports 148*c* coupled to the compressor 146 for pressurizing the reservoir 148. Furthermore, the reservoir 148 may include a fill port 148*d* configured to receive a replenishing supply of water or cleaning solution and a cap 150 (such as a rubber cap) may seal the fill port 148*d* during use of the cleaning system. That is the sealed cap provides easy maintenance and replacement or refilling of washer fluid.

The first outlet 148*a* and the second outlet 148*b* may be closed and sealed when the cleaning system is not being operated to dispense water and/or air onto the outermost lens element 120*a*. With the reservoir 148 pressurized, the first and second outlets are selectively opened to allow the selected water or air to flow through the respective outlet and along the supply channel 144 to the nozzle 142. For example, a first or air supply solenoid 152 may be disposed between the first outlet 148*a* and the supply channel 144, such as integrated with the first outlet 148*a*, and selectively activated to allow pressurized air to flow to the nozzle 142. Similarly, a second or water supply solenoid 154 may be disposed between the second outlet 148*b* and the supply channel 144, such as integrated with the second outlet 148*b*, and selectively activated to allow pressurized water or cleaning solution to flow to the nozzle 142.

The compressor 146, the first solenoid 152, and the second solenoid 154 may be selectively electrically operated and energized by a cleaning system control module, such as a controller disposed at the camera ECU or an ECU at the vehicle. The ECU may operate the cleaning system in response to an input, such as a user input at the interior portion of the vehicle, or based on processing of image data captured by the camera 114. The cleaning system may be operable according to a program, such that the received input causes the cleaning system to dispense water or cleaning solution for a period of time (e.g., for one second or more, for two seconds or more, for three seconds or more, and the like) and subsequently dispense air for a period of time (e.g., for one second or more, for two seconds or more, for three seconds or more, and the like). Optionally, based on processing of captured image data and a determination of contaminants at the outermost lens 120*a*, the cleaning system may activate the second solenoid 154 to direct water or cleaning solution onto the lens, and may optionally continue directing water or cleaning solution until contaminants are no longer detected. Then, based on processing of captured image data and a determination of moisture at the outermost lens 120*a*, the cleaning system may activate the first solenoid 152 to direct air onto the lens, and may optionally continue directing air until moisture is no longer detected.

Optionally, the reservoir may be equipped with a single outlet for supplying pressurized fluid and pressurized air to the nozzle. A volume of washer fluid may be metered to the reservoir and the solenoid coupled to the single outlet may be activated to dispense the entire volume of washer fluid. With the volume of washer fluid dispensed from the reservoir, the solenoid may remain active to direct pressurized air through the single outlet to the nozzle. Thus, the reservoir may hold a single allotment or measurement of washer fluid that is dispensed to the nozzle, and the washer fluid may be replenished between activations of the cleaning system.

Thus, the cleaning system effectively washes and dries the camera lens using a system of simple components, such as the compressor, air and liquid reservoirs, tubes, solenoid valves, and a nozzle. The cleaning system may provide a robust camera cleaning technology with prolonged lifespan and simple user interaction.

Optionally, the camera module may include a transparent outer lens that rotates or pivots to clean the transparent outer lens without mechanically blocking the optical path of the camera. Pressurized water or cleaning solution or washer fluid may impart the rotational or pivotal movement of the outer lens.

For example, and referring to FIGS. 10-27, a camera module 214 may include a protective housing or shell 256 that houses the camera 214 at an interior portion of the protective housing 256 and a transparent outer lens or cover element 226 that may be movably disposed at the protective housing 256. For example, the housing 256 includes a first or upper housing portion 256*a* and a second or lower housing portion 256*b* that join together to accommodate the camera module 214 at the interior of the housing 256. The upper housing portion 256*a* and the lower housing portion 256*b* cooperate to form a cylindrical or annular channel or passage at which the outer lens 226 is disposed. The camera views exterior of the vehicle through the outer lens 226 and the outer lens 226 is exposed exterior of the vehicle. The outer lens 226 may be pivotable relative to the protective housing 256 and pivots or rotates or spins within the cylindrical channel of the housing 256 about a pivot axis that is substantially parallel to a longitudinal axis of the lens barrel, or a viewing axis of the camera. A wiper element 234 is disposed at least partially across the outer lens 226 outside the field of view of the camera and engages an outer surface of the outer lens 226. When the outer lens 226 spins relative to the protective housing 256, the wiper element 234 engages the outer surface of the outer lens 226 and removes contaminants and/or moisture from the outer lens 226.

Figure 19:
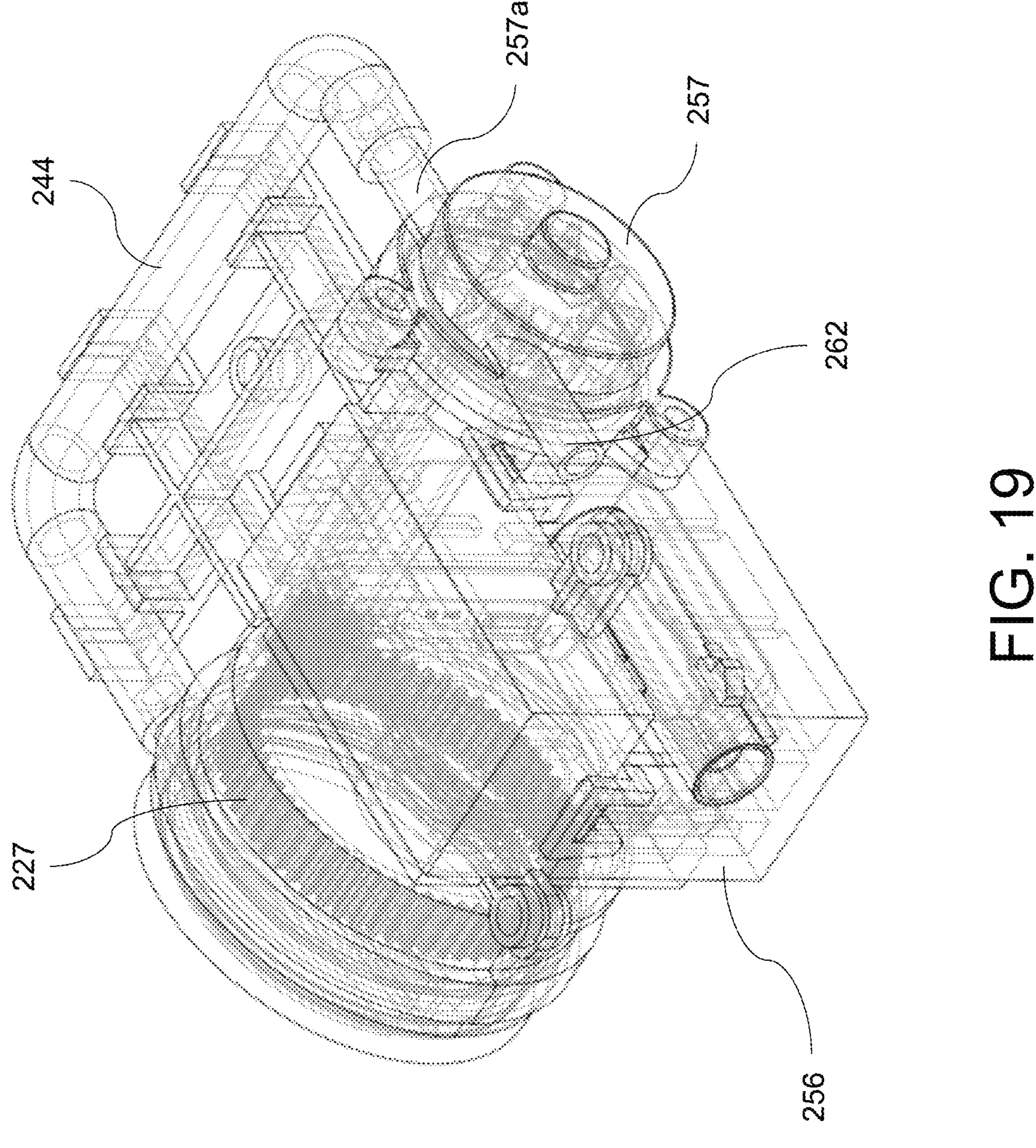
Figure 20:
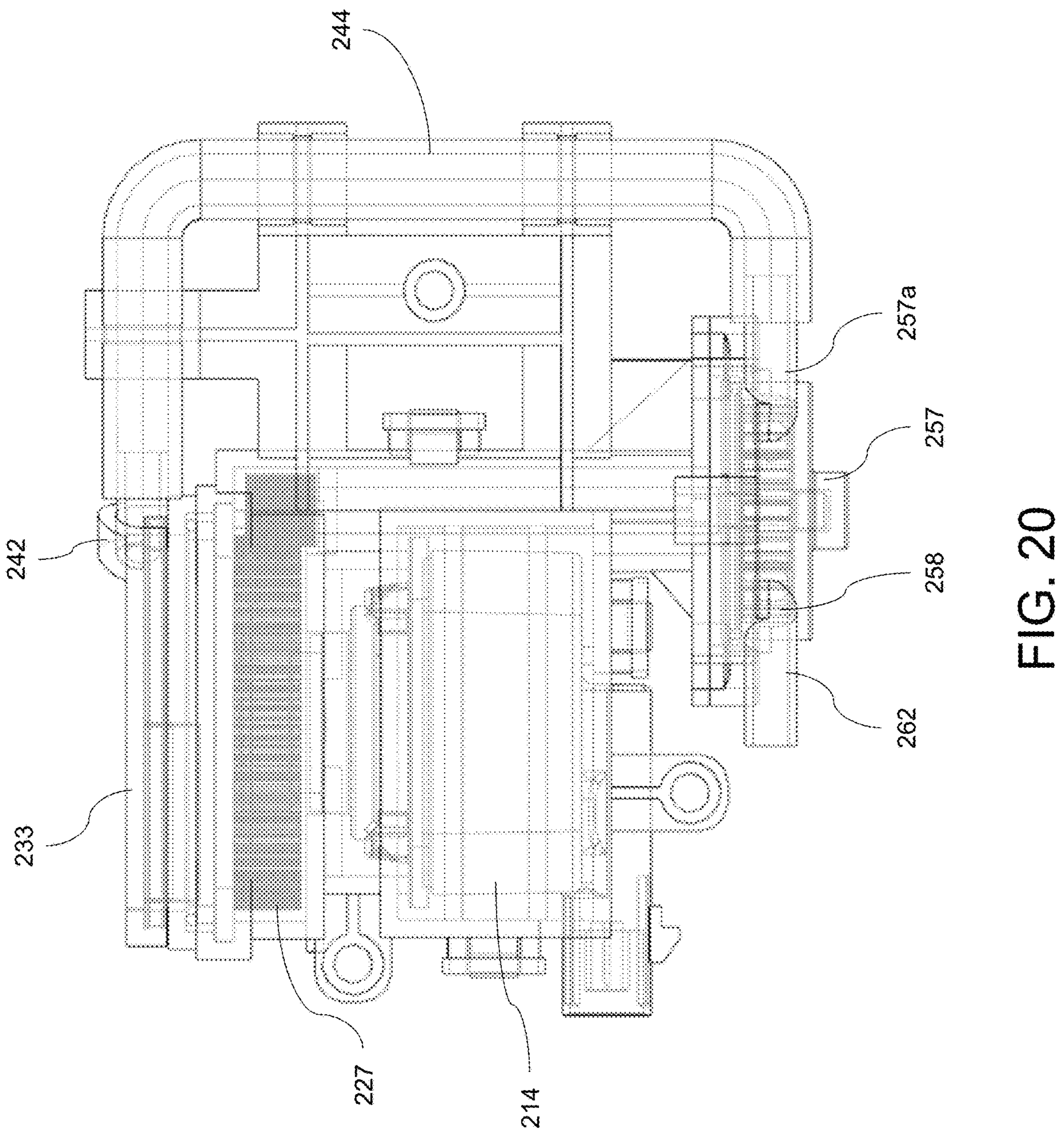
Figure 21:
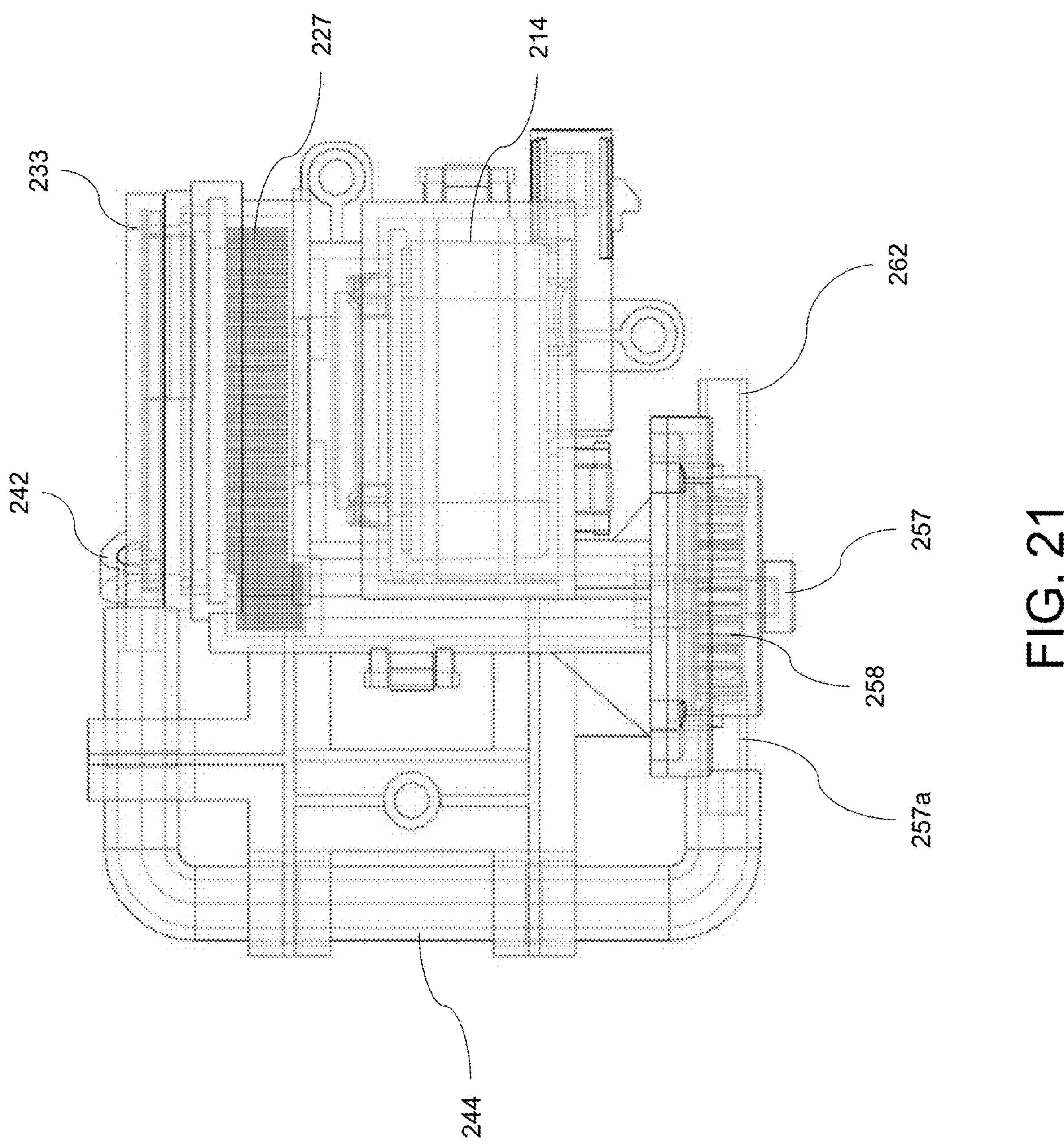
Figure 22:
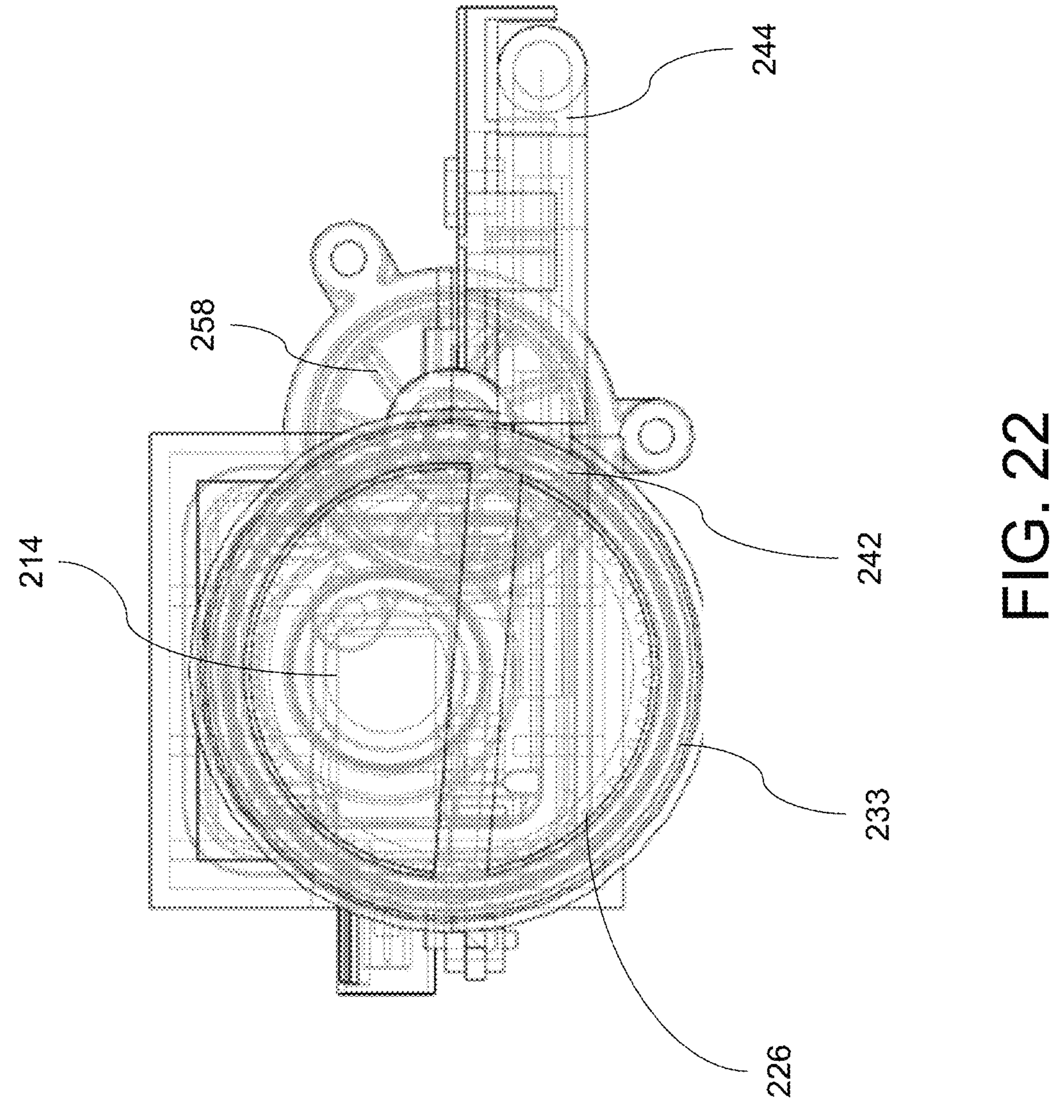
Figure 23:
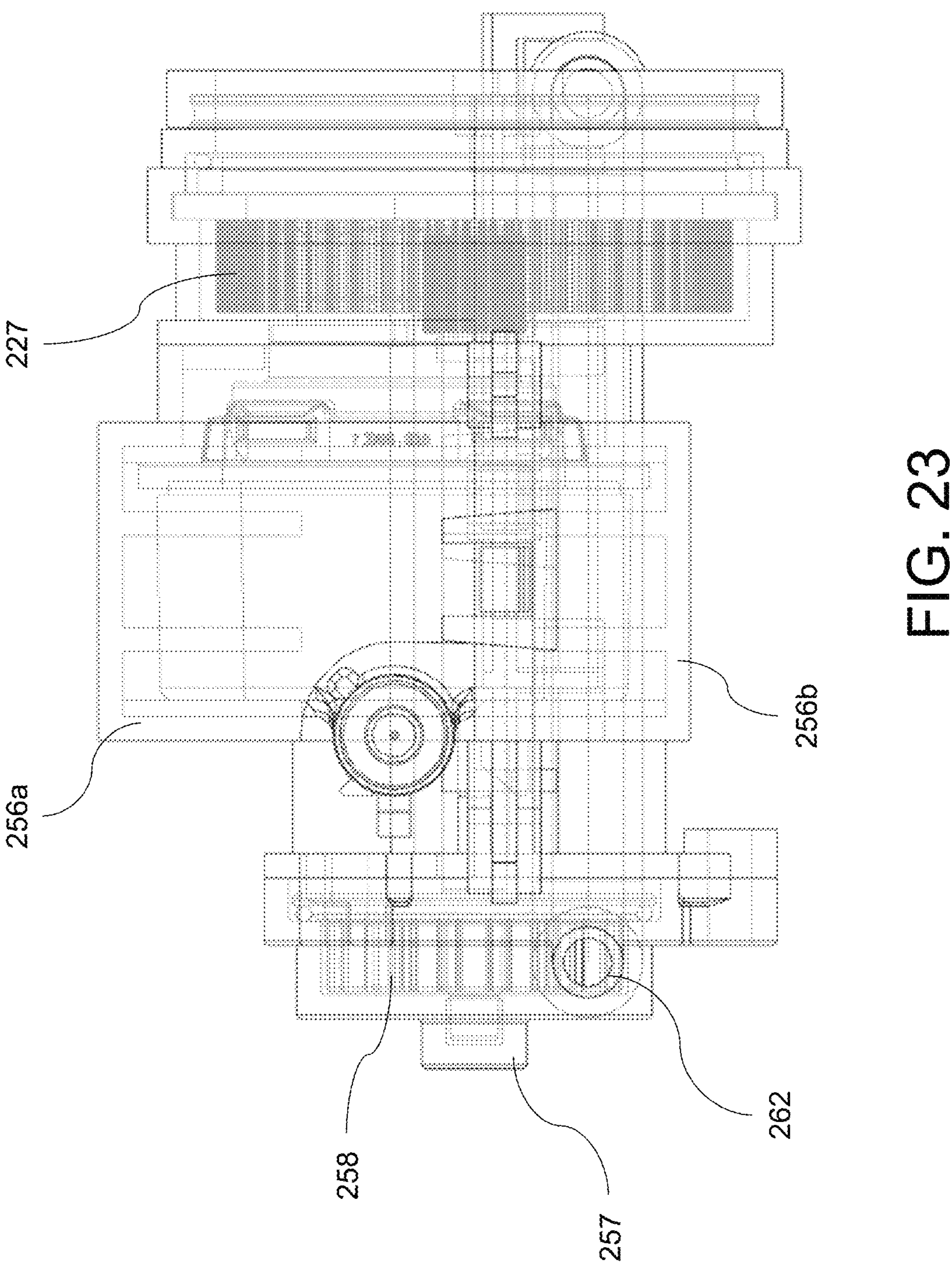
Figure 24:
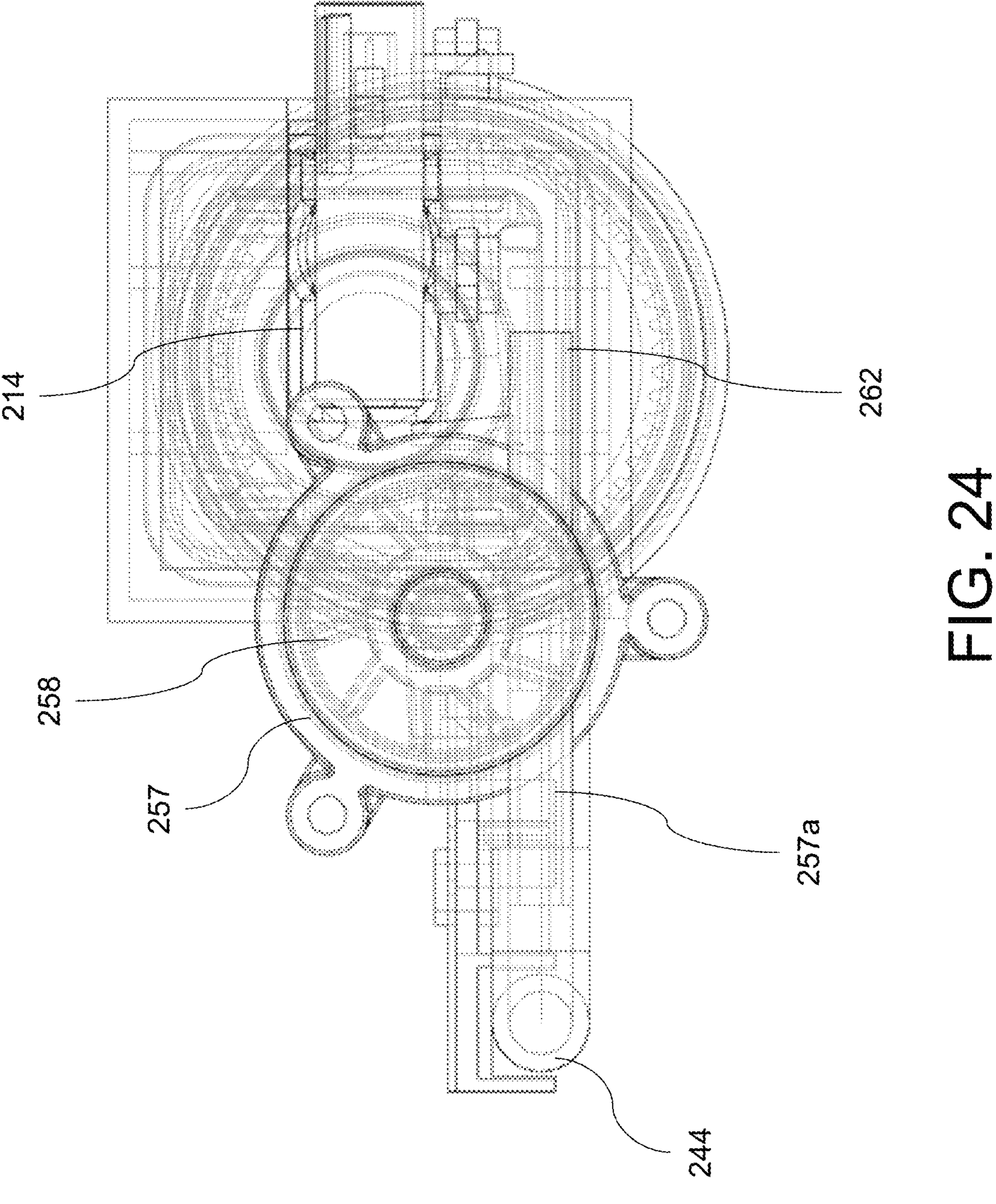
Figure 25:
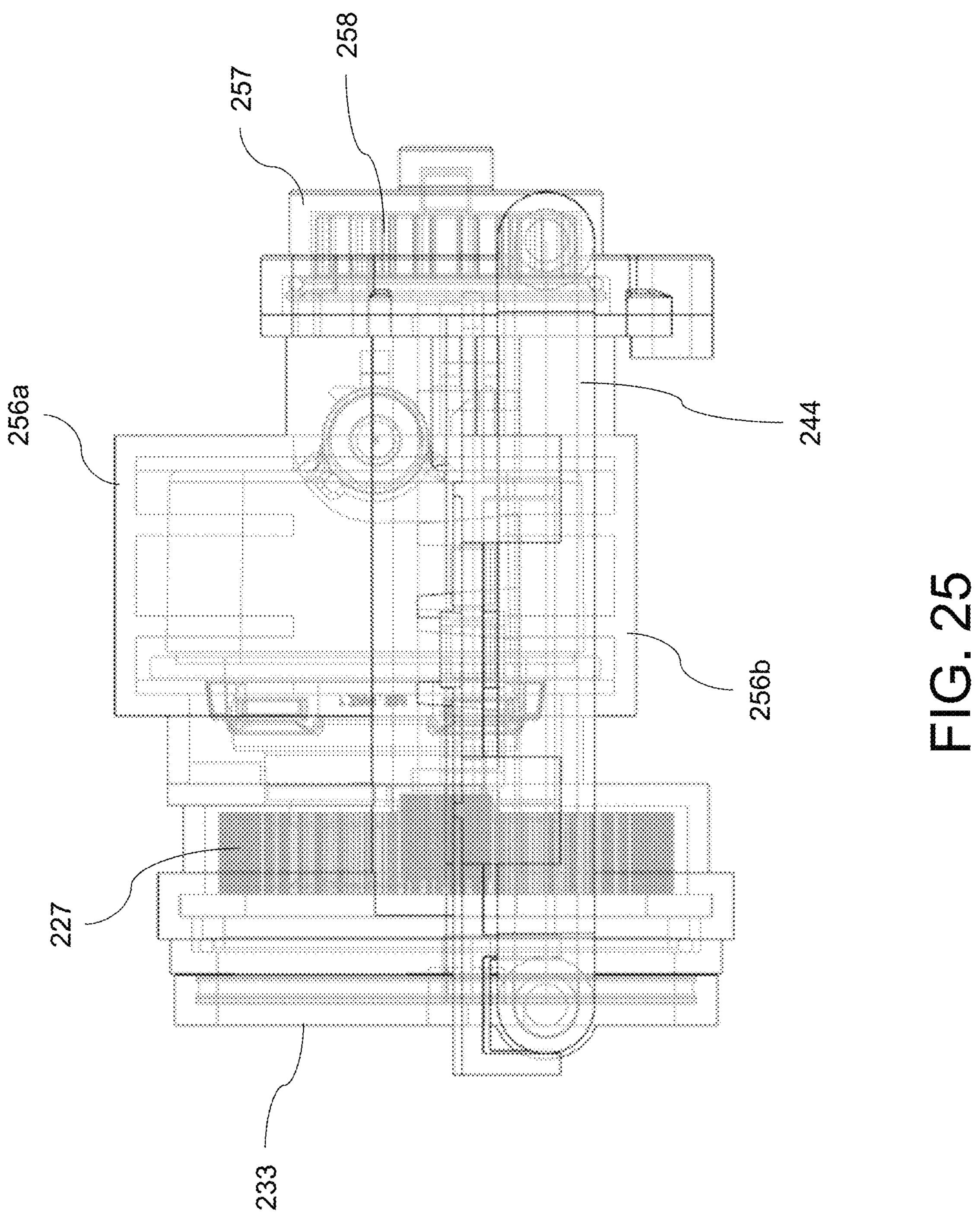
Figure 26:
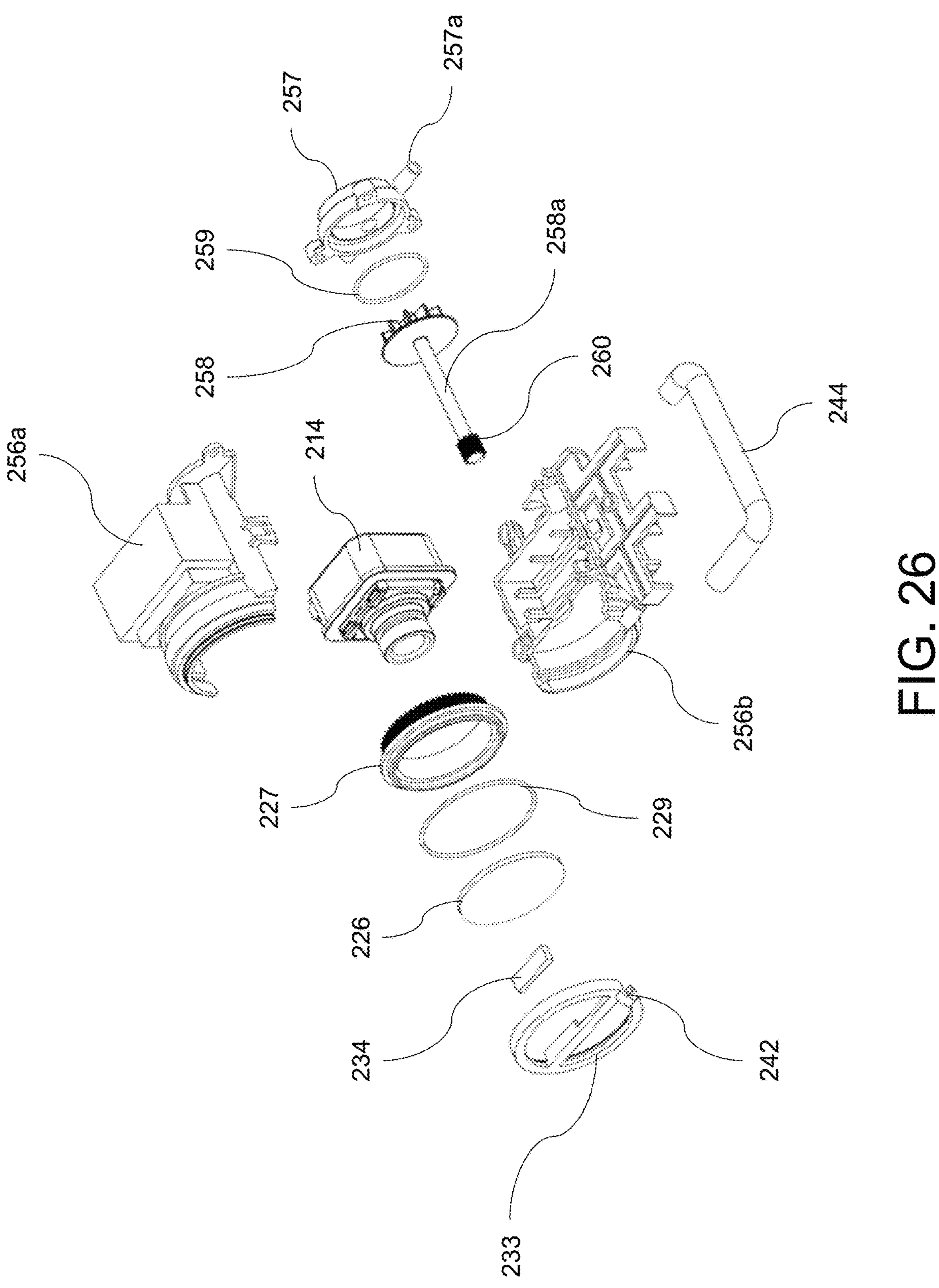
Figure 27:
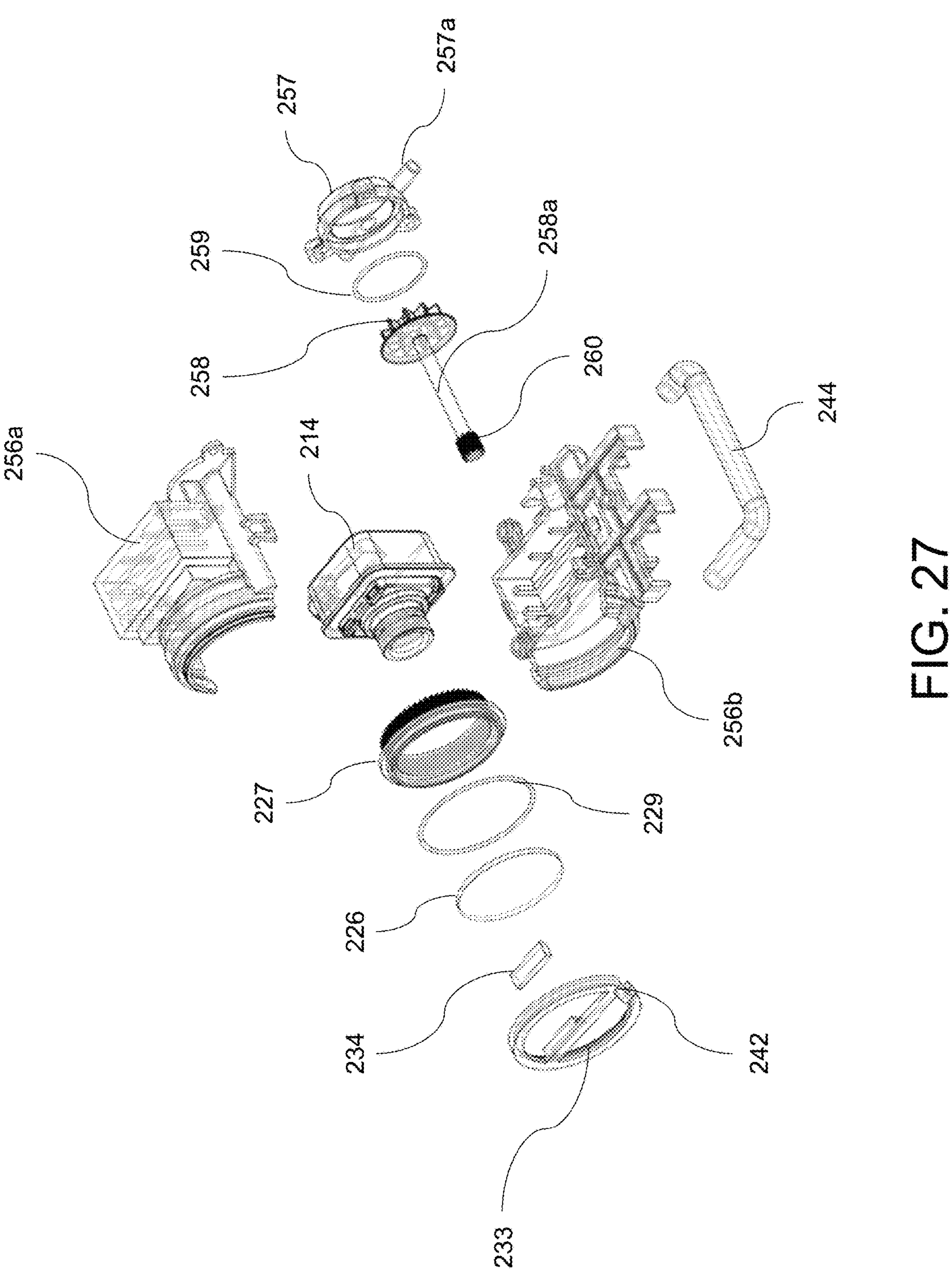
Figure 28:
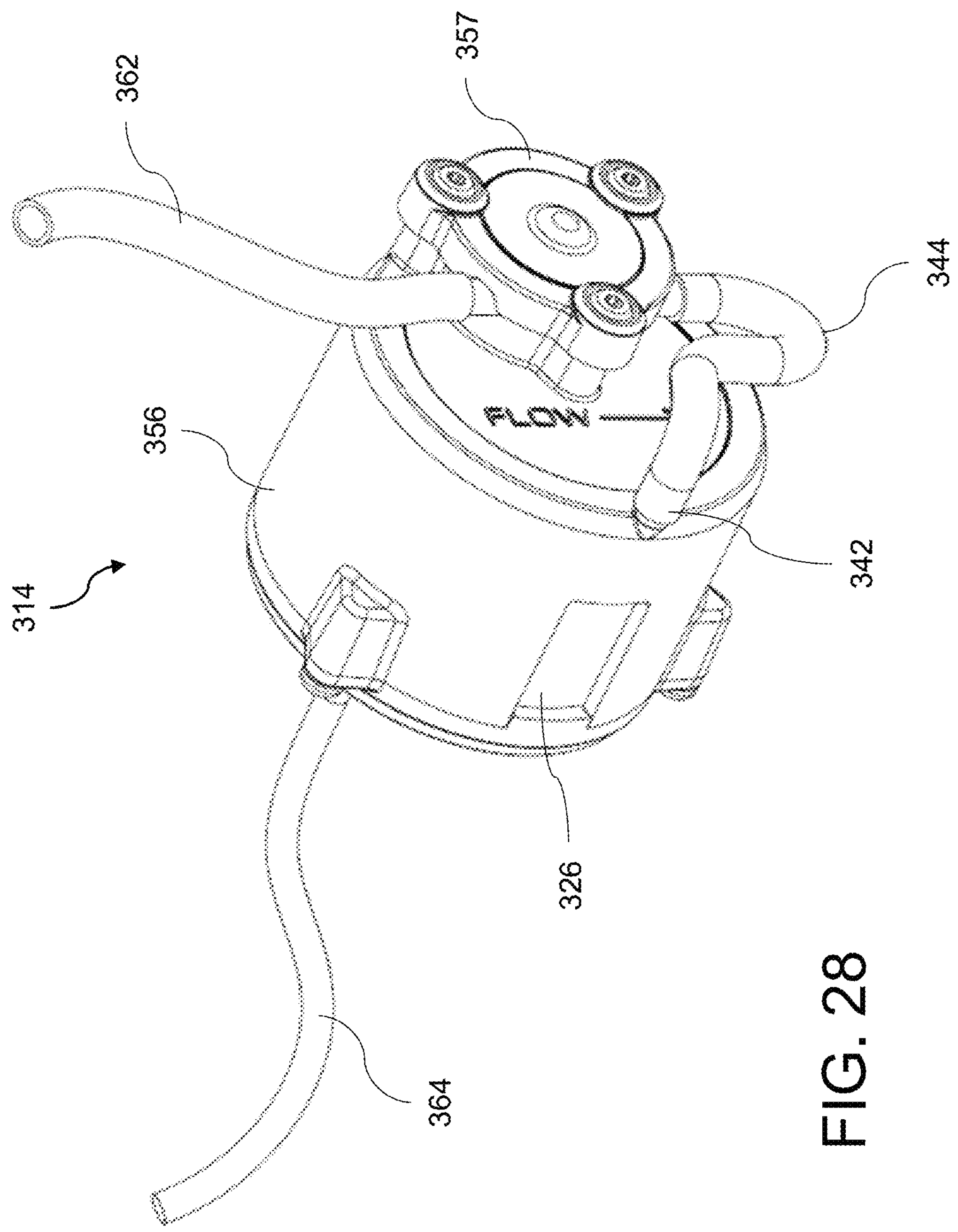
FIGS. 28-44 are views of another camera module with a transparent outer lens that is rotatably driven by pressurized washer fluid.
Figure 29:
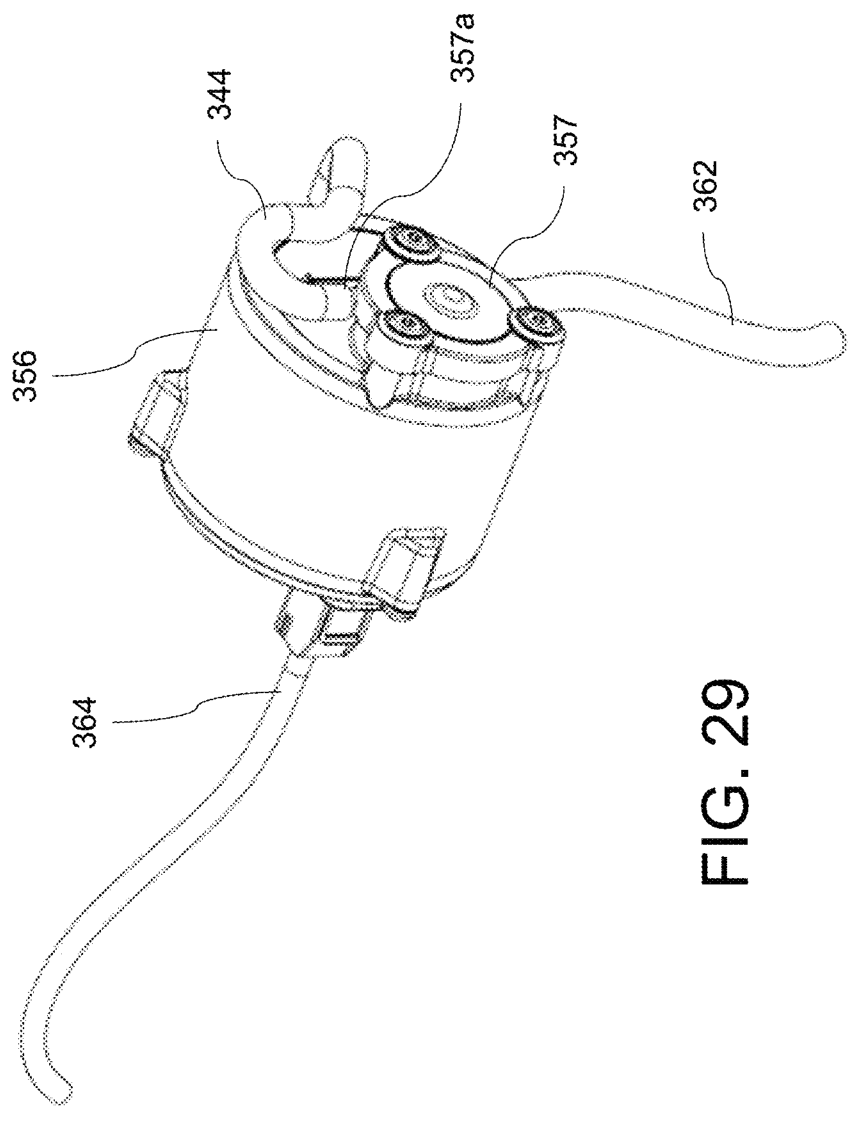
Figure 30:
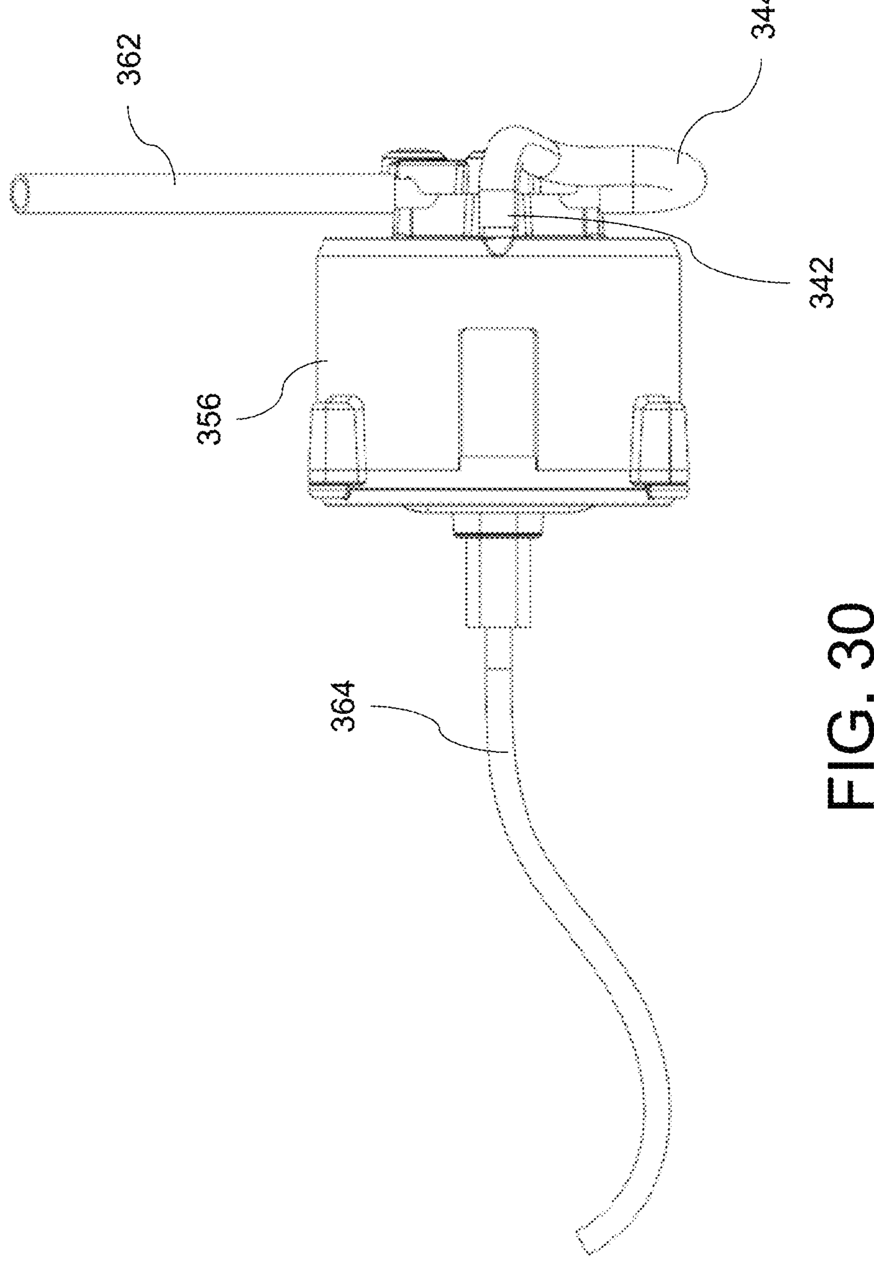
Figure 31:
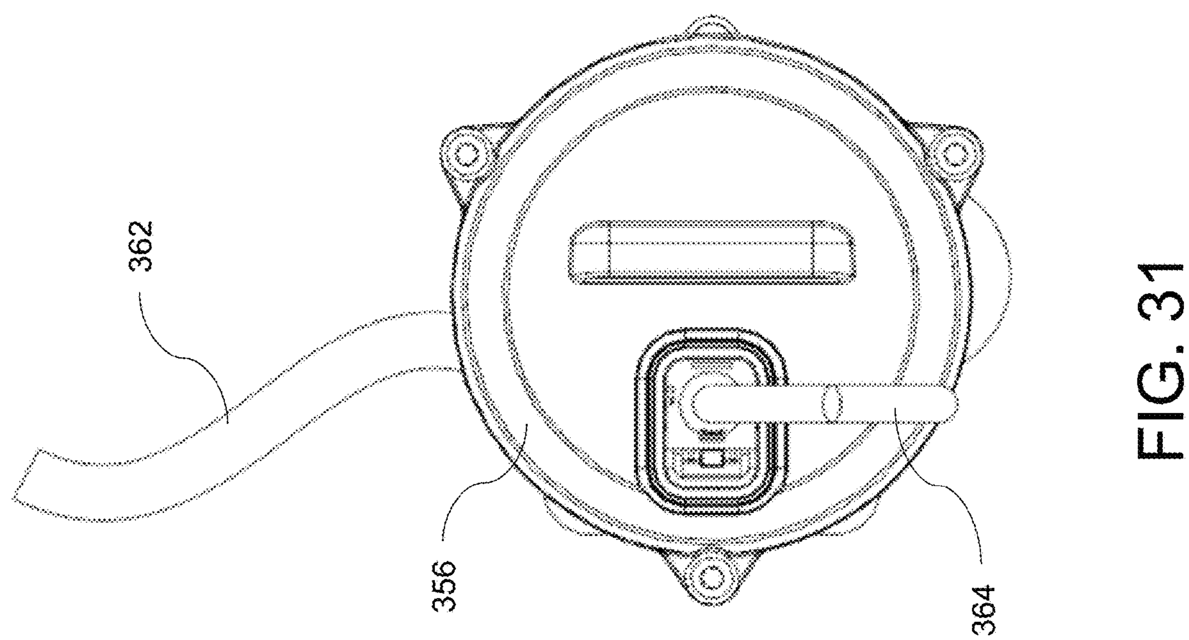
Figure 32:
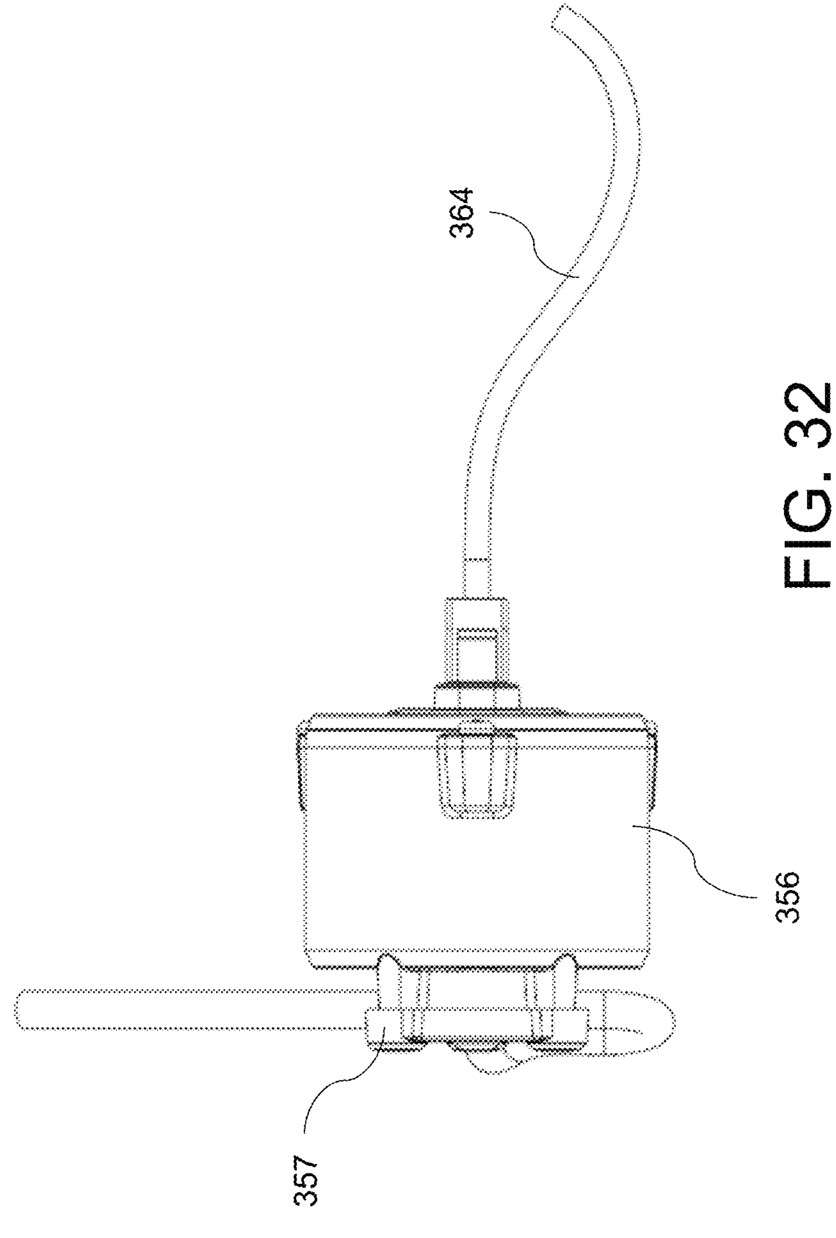
Figure 33:
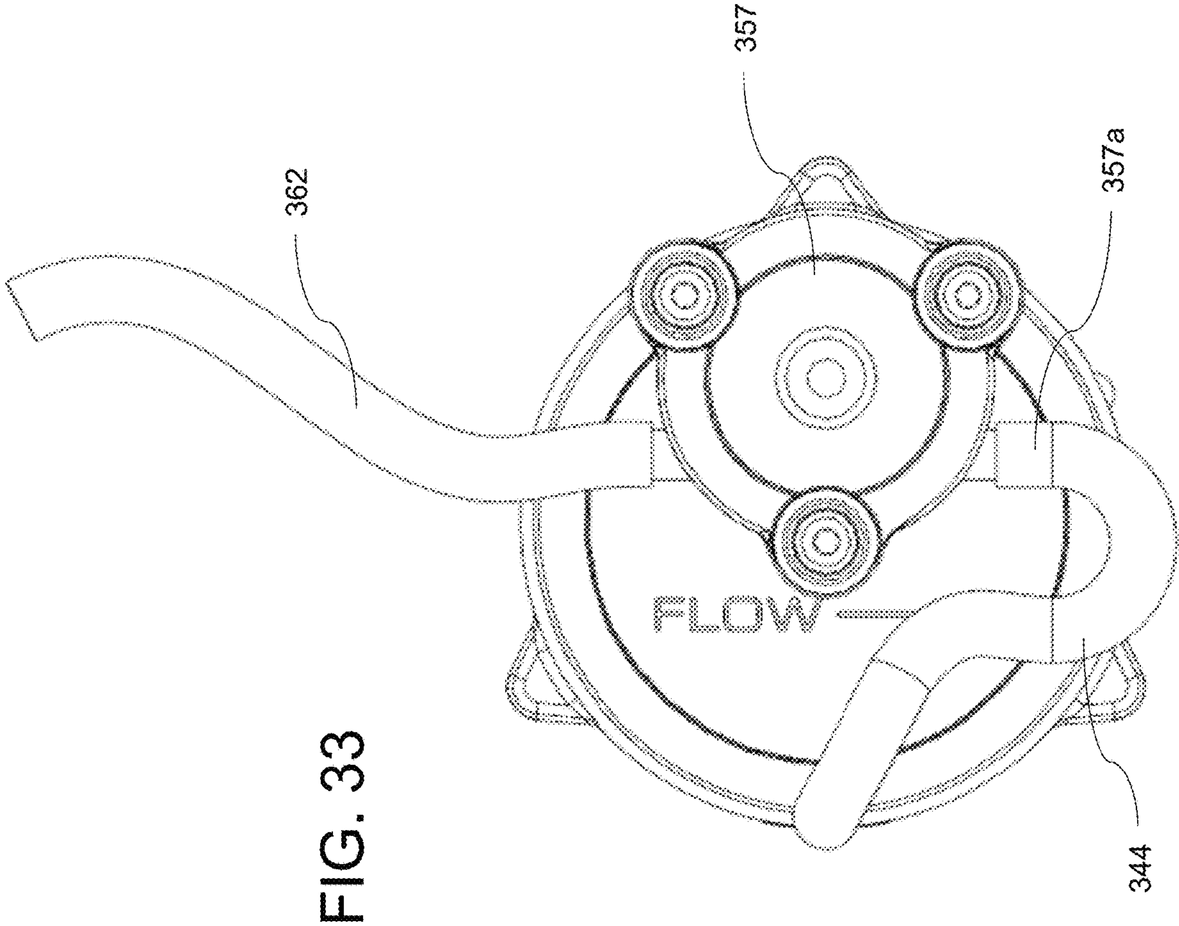
Figures 34, 35:
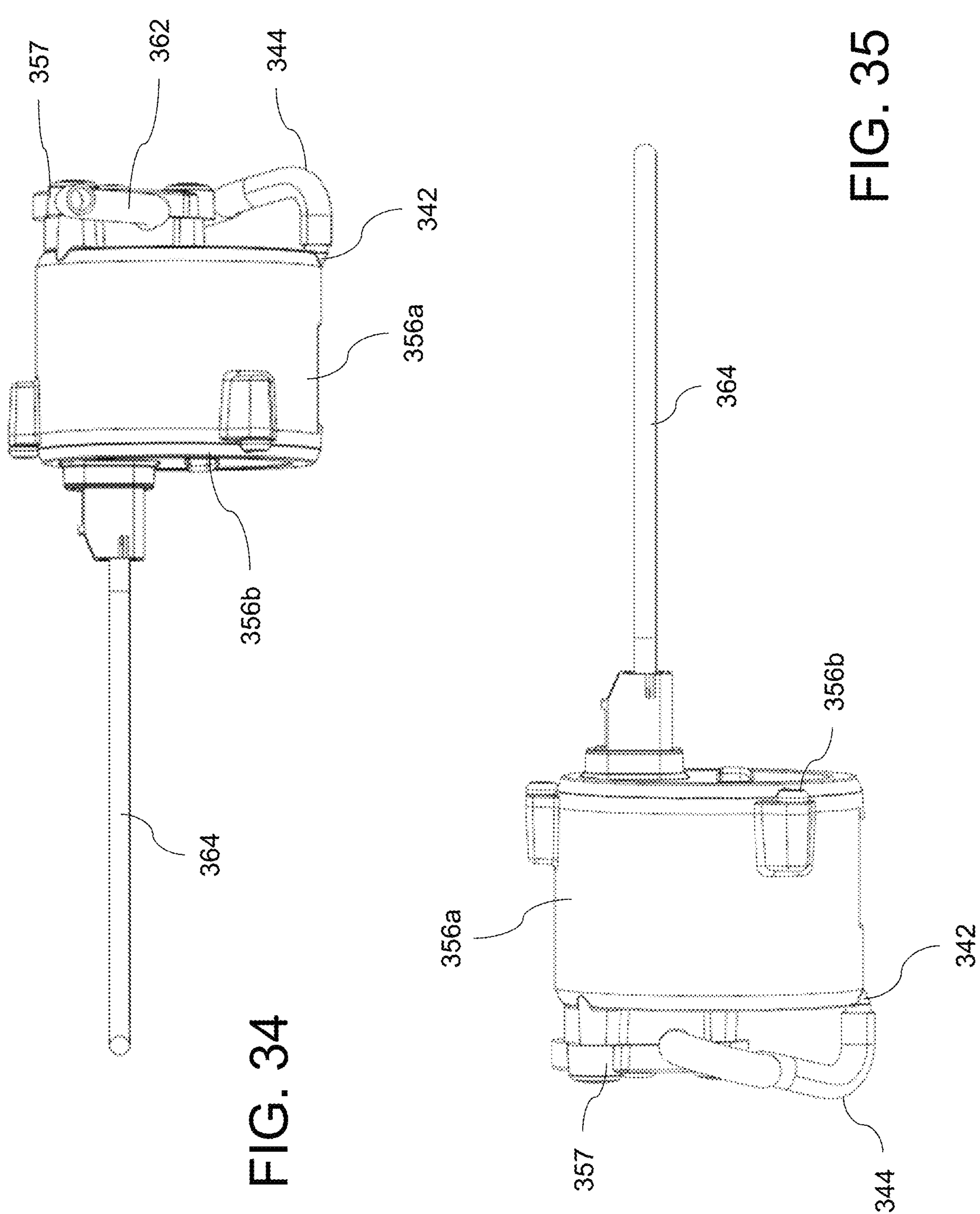
Figure 36:
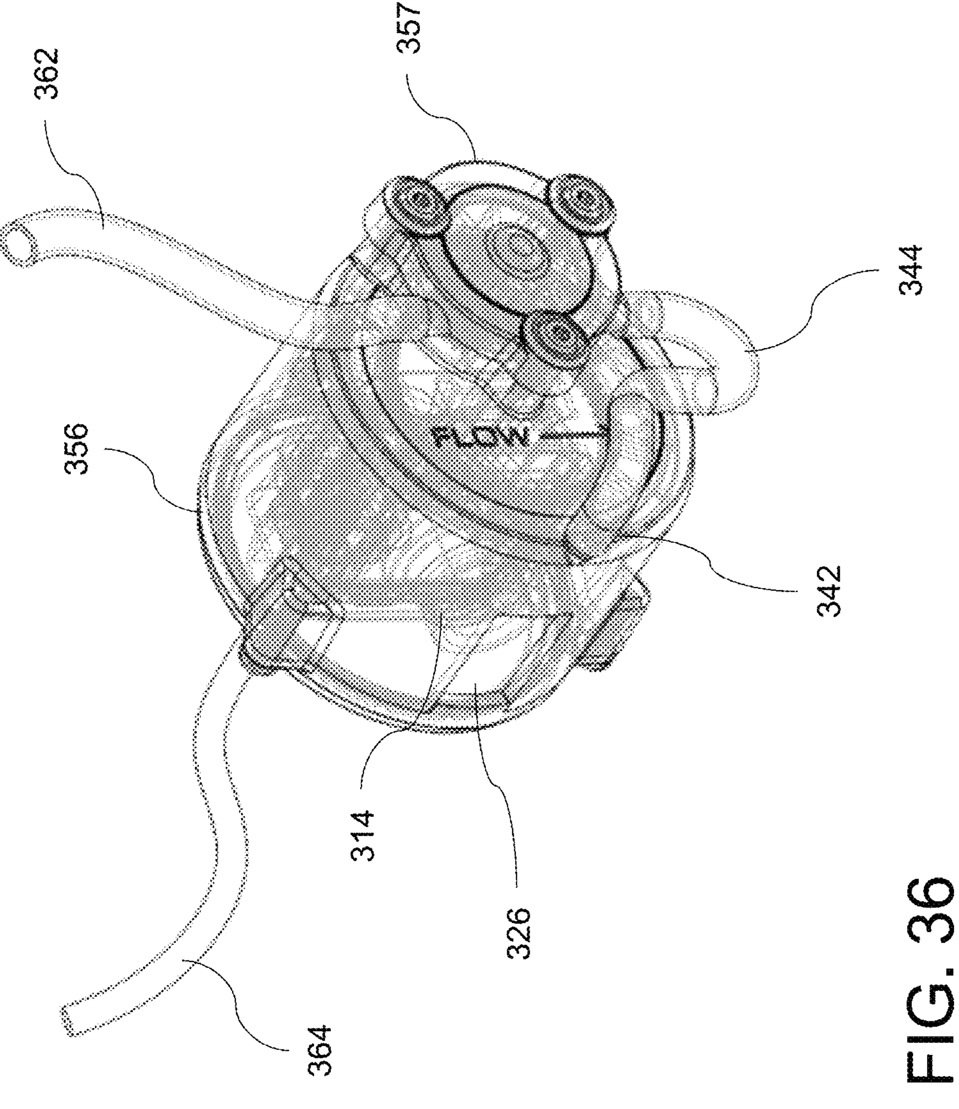
Figure 37:
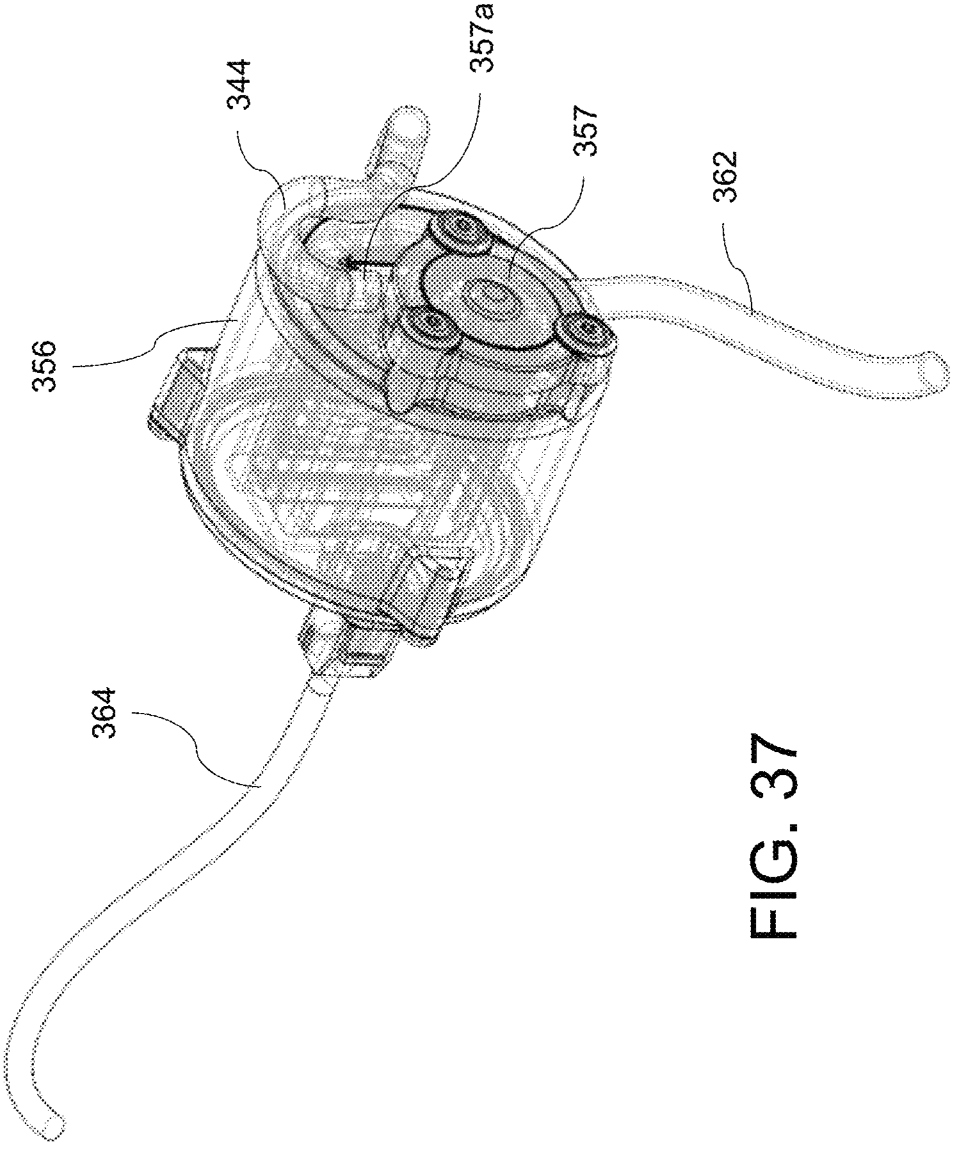
Figure 38:
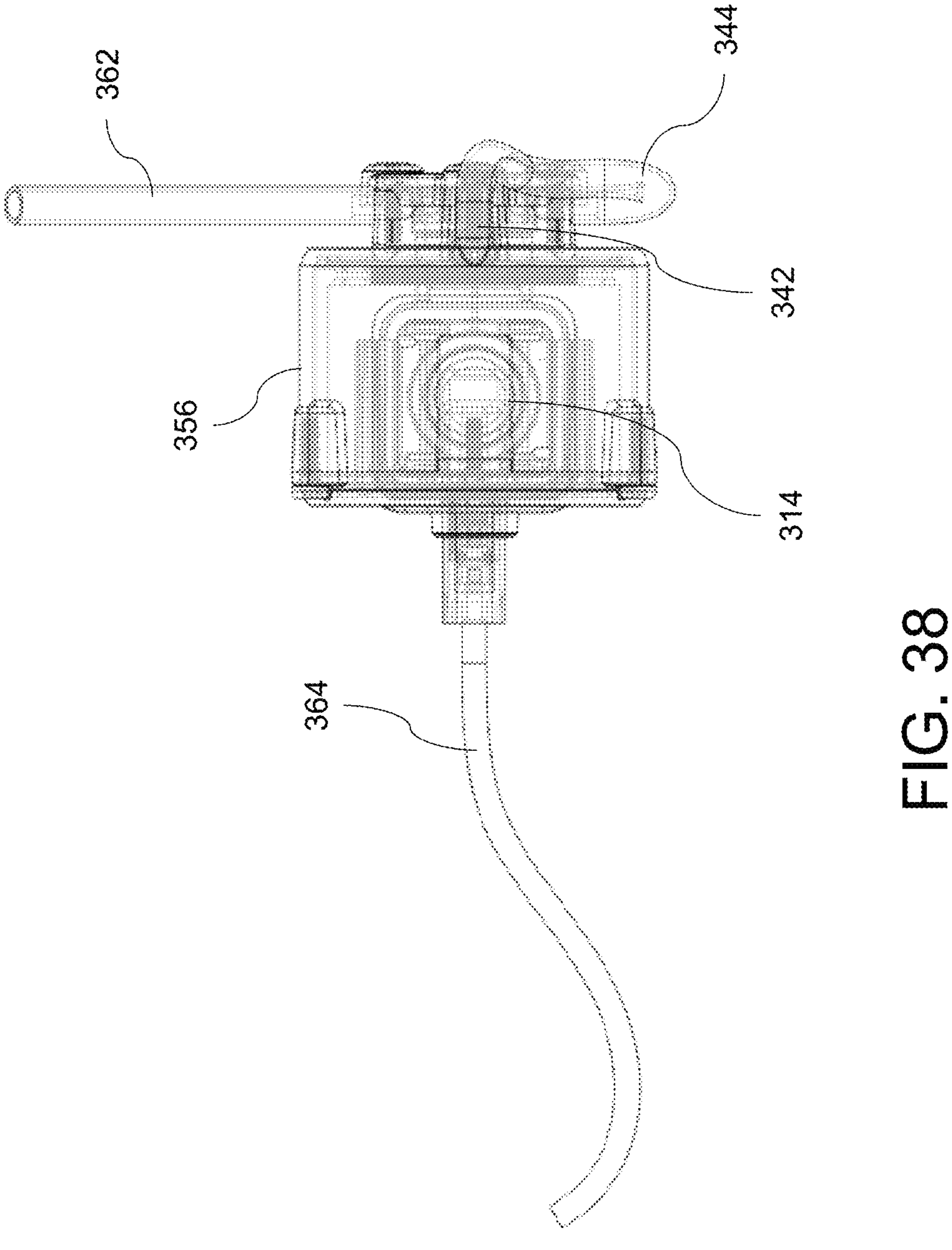
Figure 39:
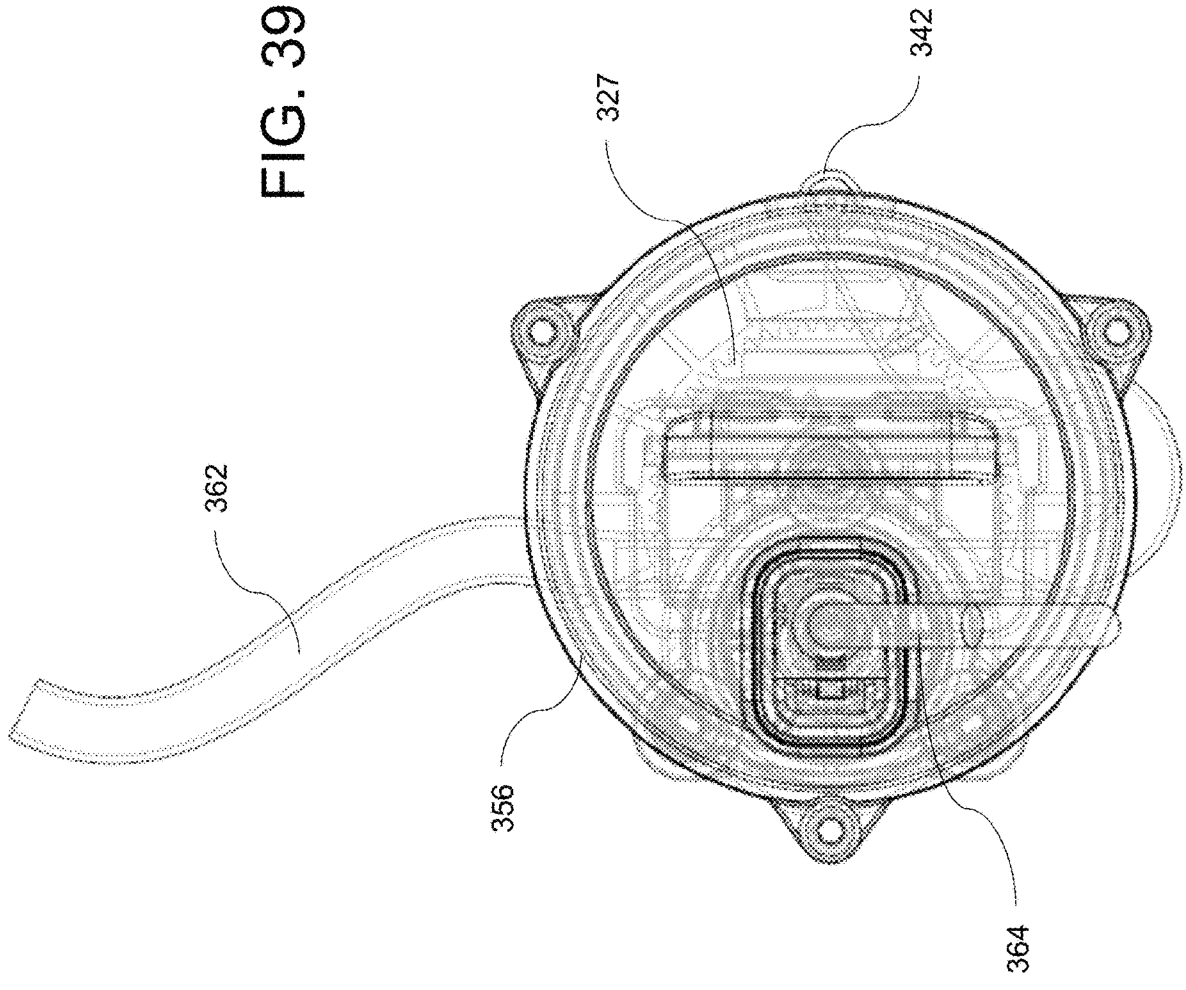
Figure 40:
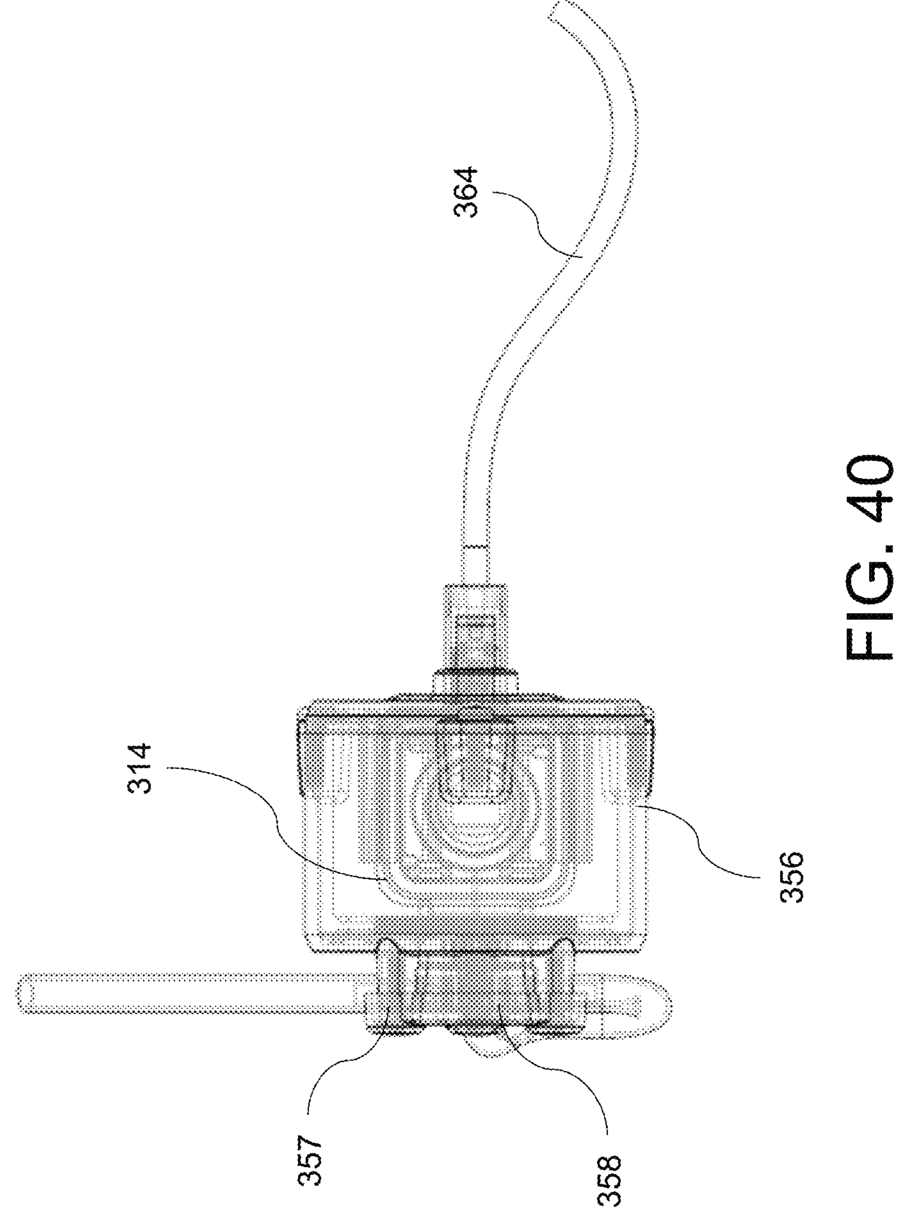
Figure 41:
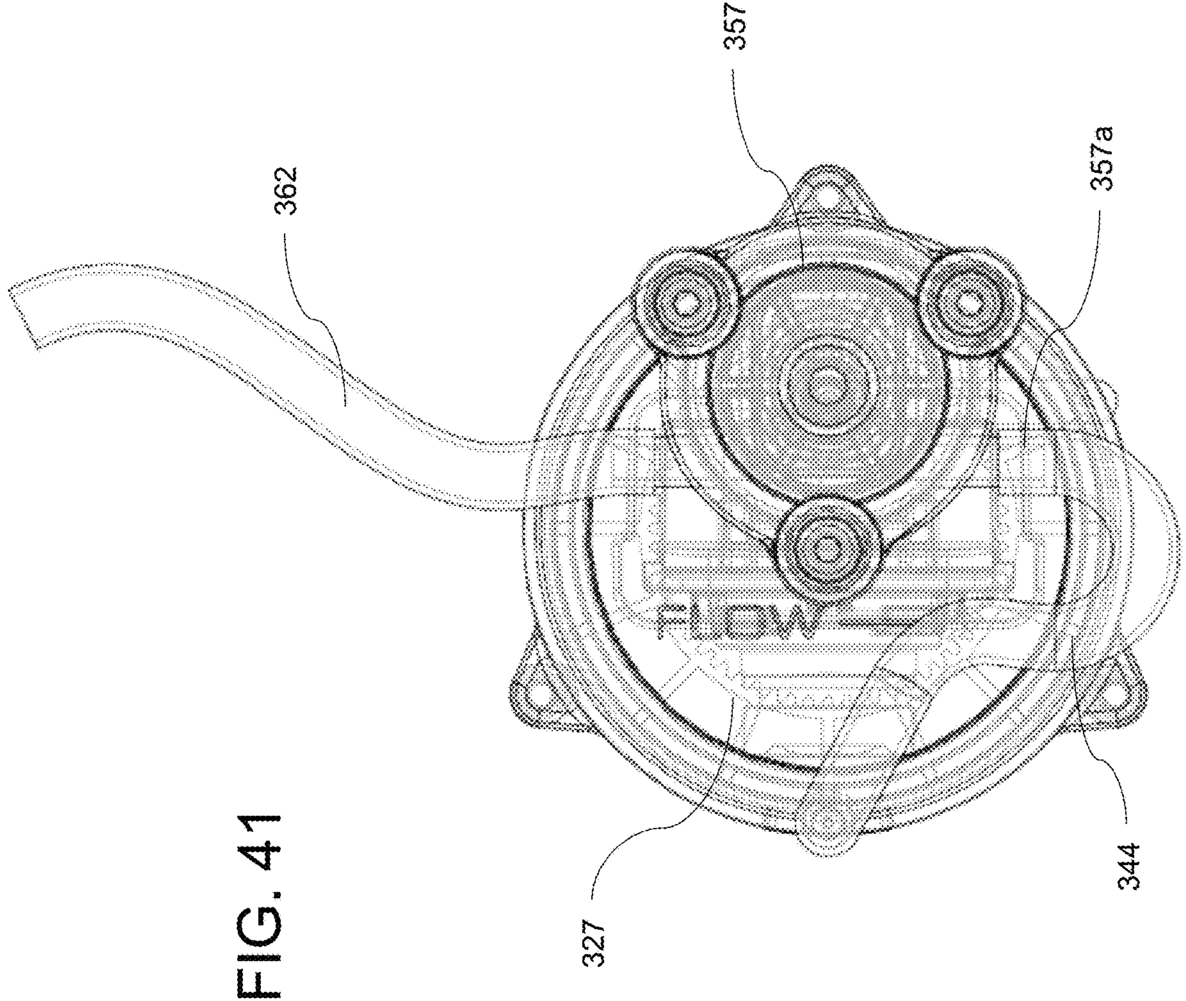
Figures 42, 43:
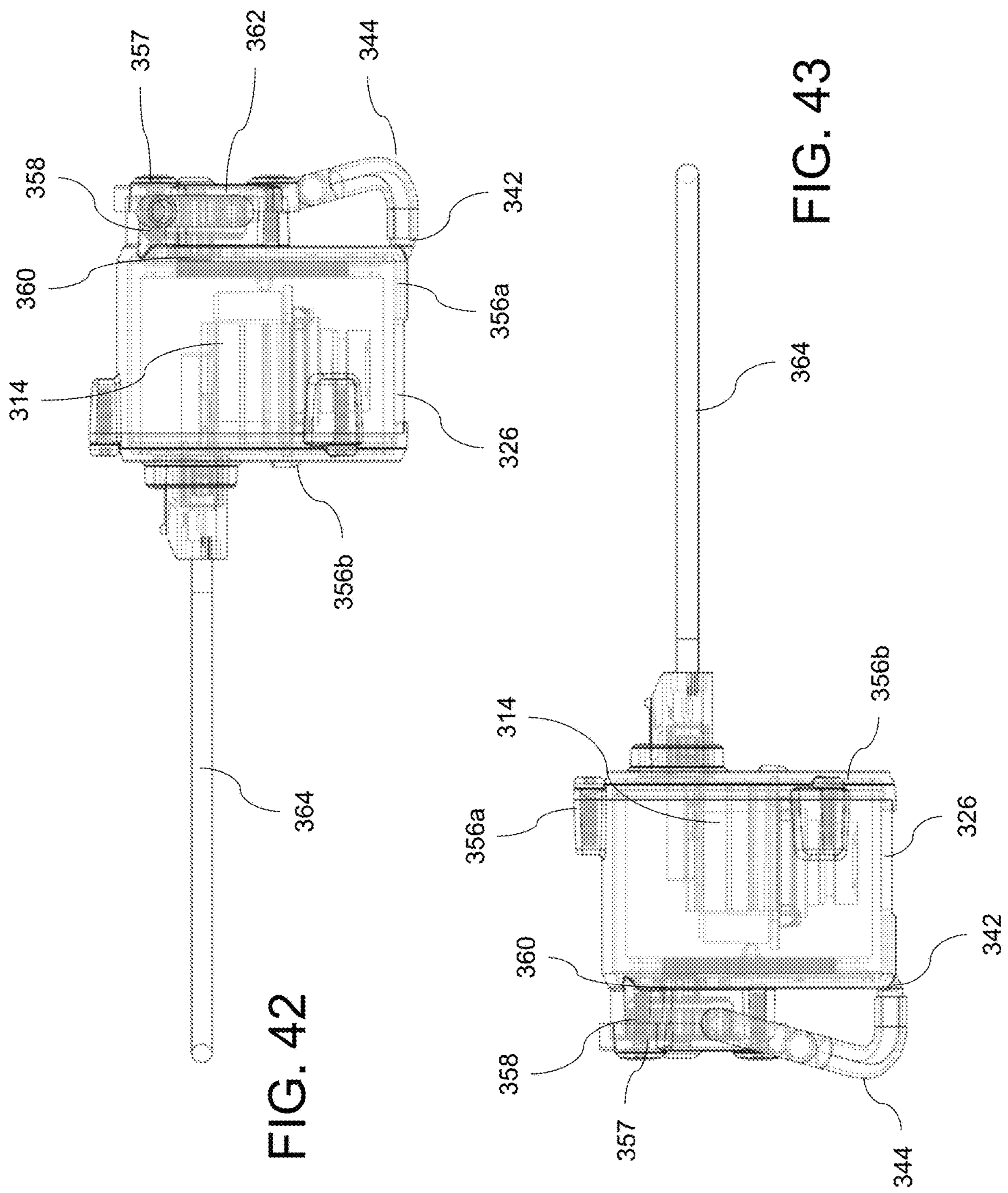
Figure 44:
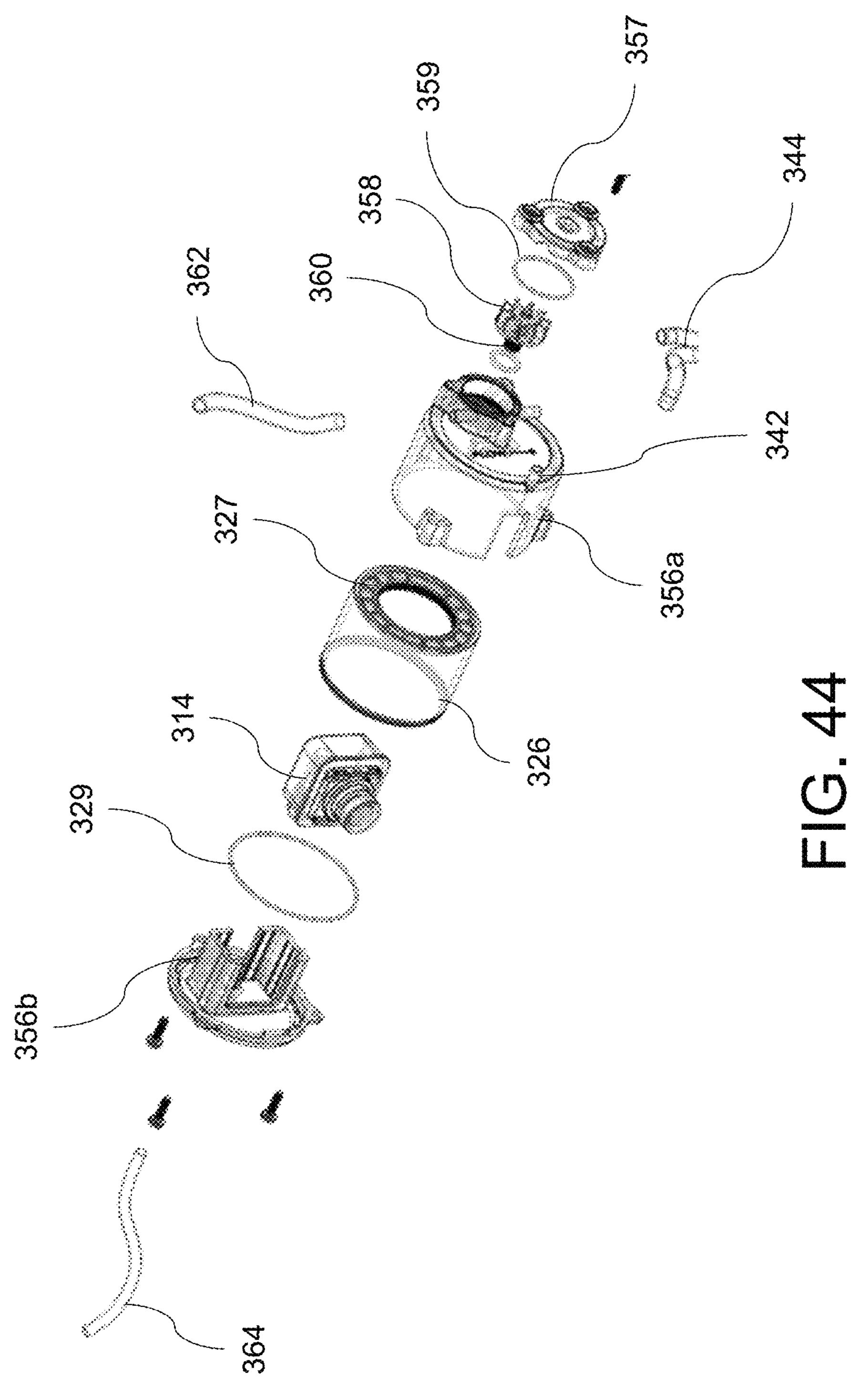
Figure 46:
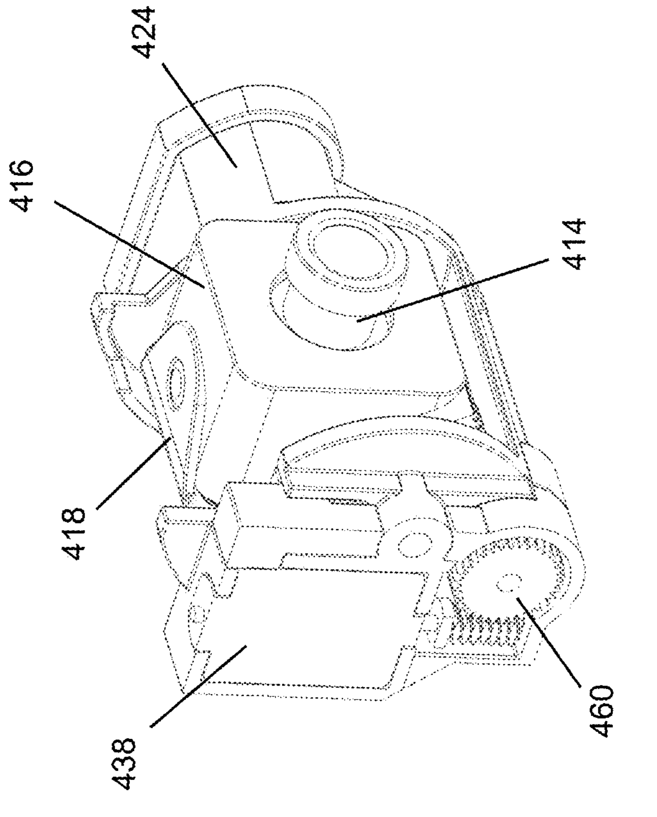
FIG. 46 is a sectional view of the camera module of FIG. 45, showing the electrically operable motor and gear train of the actuator.
Figure 45:
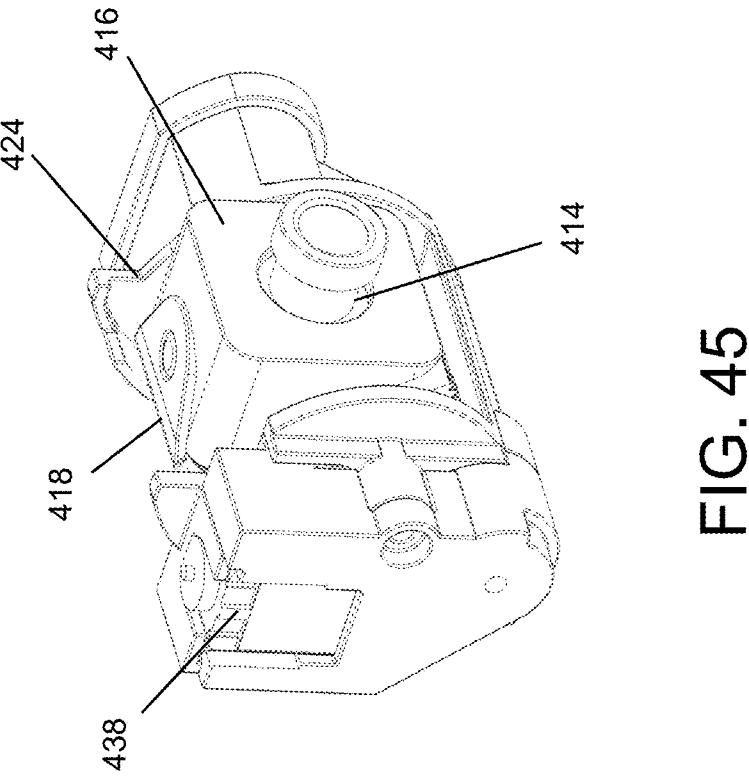
FIG. 45 is a perspective view of a camera module that is pivotably mounted at a mounting bracket and an actuator that is operable to pivot the camera module relative to the mounting bracket.
Figures 47A, 47B, 47C:
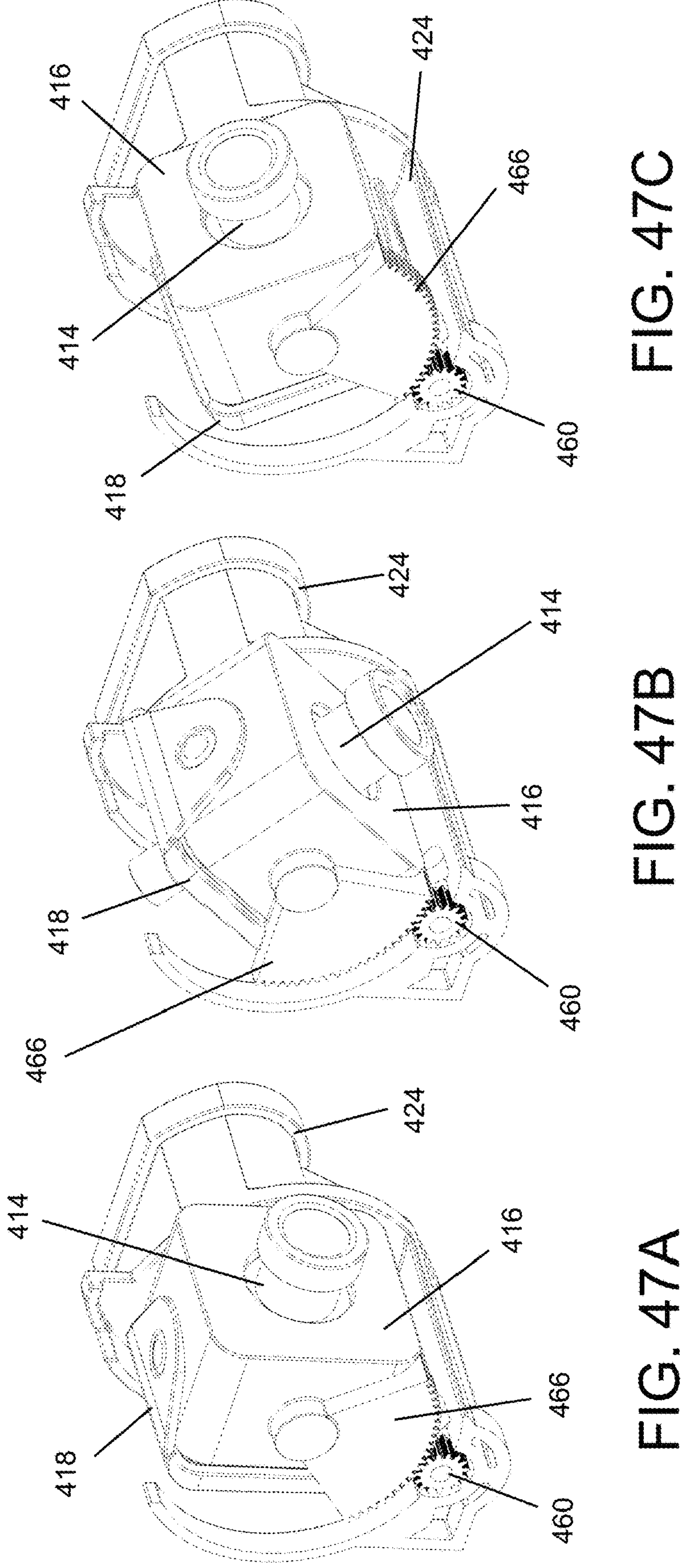
FIGS. 47A-47C are perspective views of the camera module of FIG. 45, showing the camera module pivoted relative to the mounting bracket between different positions.
Figure 48:
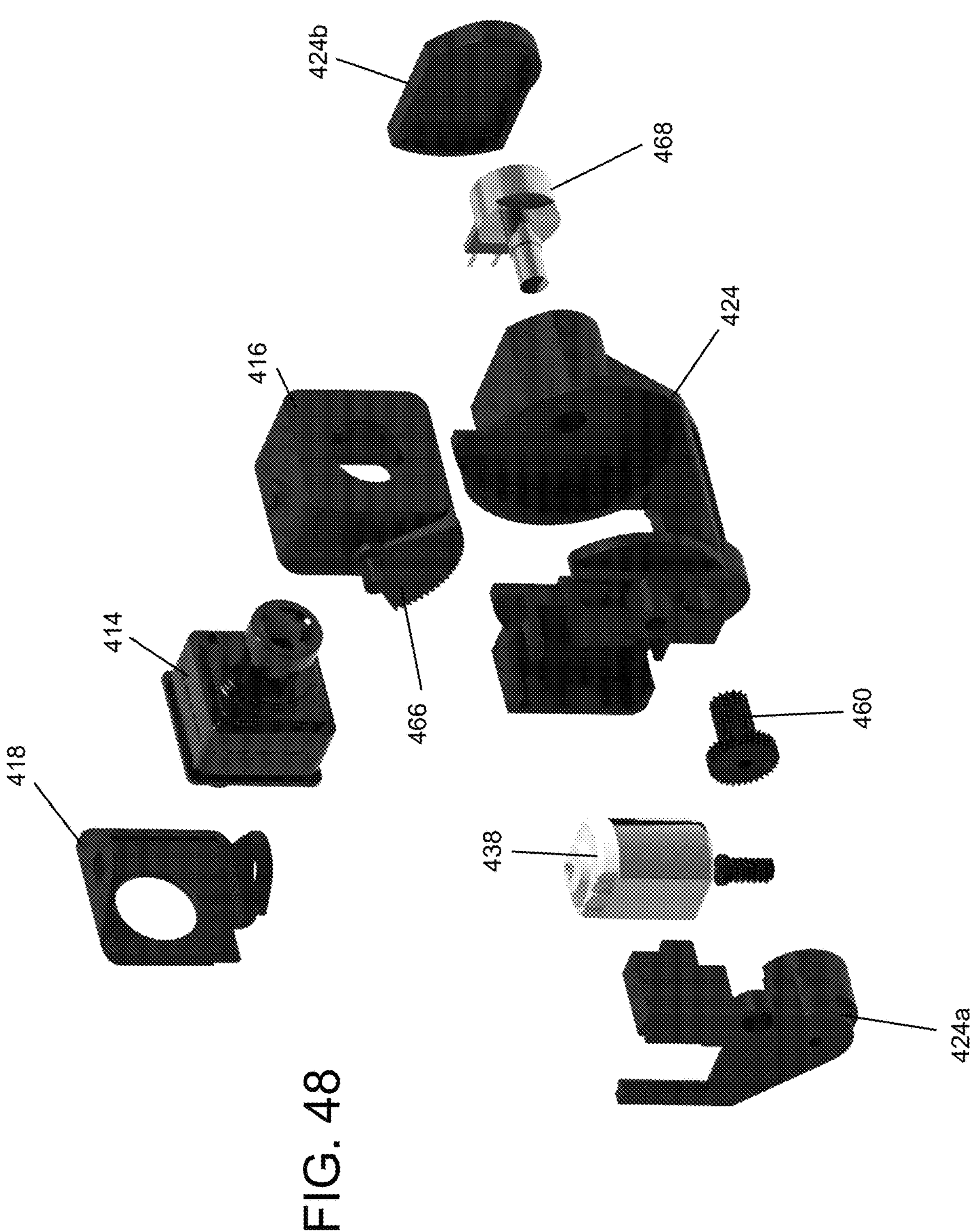
FIG. 48 is an exploded view of the camera module of FIG. 45.

Rotation of the outer lens 226 may be powered or caused by pressurized water or washer fluid energizing a gear train that drives the outer lens 226. In the illustrated example of FIGS. 10-27, the pressurized fluid is received at a turbine or other suitable receiving gear 258 that spins or rotates based on the pressurized fluid flowing through or across the turbine 258. The turbine 258 is coupled to the outer lens 226 via a gear train 260 and movement of the turbine 258 drives the gear train 260 to impart pivotal motion of the outer lens 226. For example, the outer lens 226 may be accommodated by a cylindrical or ring-shaped gear element 227 that engages and is driven by the gear train 260 extending from the turbine 258 (FIGS. 19 and 20). That is, the ring-shaped gear element 227 may be coupled to the outer lens 226 so that the outer lens 226 and the ring-shaped gear element 227 rotate together and in tandem with one another. The gear train 260, turbine 258, and outer lens 226 may be accommodated by the protective outer shell 256.

In other words, the outer lens 226 is received at the ring-shaped gear element 227 that is disposed along the cylindrical channel of the housing 256 and that is rotatable within the channel to rotate or spin the outer lens 226. A gasket or sealing element 229 may be disposed at the peripheral edge region of the outer lens 226 and between the lens 226 and the ring-shaped gear element 227 to preclude moisture and contaminants from entering the housing 256.

The turbine 258 is received within a watertight portion of the housing 256 so that the pressurized fluid may flow across and drive the turbine 258 without entering the portion of the housing 256 accommodating the camera 214. For example, the turbine 258 is disposed between respective outer surfaces of the upper housing portion 256*a* and the lower housing portion 256*b* and a turbine cap or housing 257. A sealing element or gasket 259 may be disposed between the cap 257 and the outer surface of the housing 256 and/or about a peripheral edge region of the turbine 258 to preclude washing fluid from leaking from the turbine housing 257.

The turbine 258, when pressurized fluid flows from a supply line 262 and across the turbine 258, drives a drive shaft 258*a* coupled to and extending from the turbine 258. The supply line 262 may receive the pressurized fluid from a reservoir and/or pump disposed at the vehicle. The drive shaft 258*a* extends at least partially into the housing 256 and drives the gear train 260. For example, the gear train 260 may include a gear element disposed at an end of the drive shaft 258*a* distal from the turbine 258. The gear train 260 engages and drives the ring-shaped gear element 227 to rotate or spin the outer lens 226.

A ring-shaped lens cover 233 may be non-rotatably disposed at the outer surface of the outer lens 226 and along the peripheral edge region of the outer lens 226, with the wiper element 234 extending between opposing sides of the lens cover 233 and along the outer surface of the outer lens 226. Thus, when the ring-shaped gear element 227 rotates to spin the outer lens 226, the outer lens 226 spins relative to the stationary or non-rotatable wiper element 234 and the wiper element 234 is thus moved along the outer surface of the outer lens 226 to remove moisture and contaminants from the outer lens 226. The camera 214 views through the outer lens 226 at a portion of the outer lens 226 that is not covered by the wiper element 234 and/or lens cover 233, such as above, below or along either side of the wiper element 234. Optionally, the lens 226 is non-rotatably disposed at the housing 256 and the lens cover 233 is rotationally fixed to the ring-shaped gear element 227 such that the lens cover 233 and wiper element 234 rotate or spin relative to the outer lens 226.

Optionally, pressurized washer fluid flows through or across the turbine 258 and into a supply channel or tube 244 that directs pressurized washer fluid at the outer lens 226 via a nozzle 242 disposed at an end of the supply channel 244. The supply channel 244 may be supported along frame structure of the lower housing portion 256*b* and connects between an outlet 257*a* at the turbine housing 257 and the nozzle 242. The nozzle 242 may be integrally formed with the lower housing portion 256*b* at or near the cylindrical channel and/or the nozzle 242 may be integrally formed with the lens cover 233 for directing the pressurized washer fluid toward the outer surface of the lens 226 and/or the wiper element 234. Thus, the pressurized washer fluid may energize the turbine 258 for rotating the outer lens 226 and the pressurized washer fluid may be directed toward the outer lens 226 for washing and/or rinsing contaminants from the outer lens 226.

Thus, the cleaning system revolves a protective lens across a serviceable wiper using washer fluid to power the gear train. The cleaning system provides a fluid driven gear train, the serviceable wiper, and quickly clears the camera field of view with no obstruction of the field of view.

Optionally, at least a portion of the pressurized fluid may be directed into the housing of the camera module between an outer lens and the housing. For example, and referring to FIGS. 28-44, a camera module 314 may include a protective housing or shell 356 that houses the camera 314 at an interior portion of the protective housing 356 and a transparent outer lens or cover element 326 that may be movably disposed at the protective housing 356. The camera views exterior of the vehicle through the outer lens 326 and the outer lens 326 is exposed exterior of the vehicle. The outer lens 326 may be pivotable relative to the protective housing 356 and pivots or rotates or spins about a pivot axis that is substantially perpendicular to the longitudinal axis of the lens barrel, or a viewing axis of the camera. For example, the protective housing 356 may comprise a cylindrical housing and the outer lens 326 may comprise an arcuate or at least partially cylindrical outer lens 326, such as like the outer lens 26 described above. One or more wiper elements may disposed at least partially across the outer lens 326 (outside the field of view of the camera) and engage an outer surface of the outer lens 326 so that, when the outer lens 326 pivots relative to the protective housing 356, the one or more wiper elements engage the outer surface of the outer lens 326 and removes contaminants and/or moisture from the outer lens 326. For example, the one or more wiper elements may be disposed at an inner surface of the protective housing 356 above and/or below an aperture or slot of the protective housing 356 through which the camera views and between the inner surface of the housing 356 and the outer surface of the outer lens 326.

In the illustrated example of FIGS. 28-44, the housing 356 includes a cylindrical first or outer housing 356*a* and a second or inner housing or housing cap 356*b* that join together to accommodate the camera module 314 at the interior of the cylindrical housing 356. The second housing 356*b* joins to the first housing 356*a* and covers an open end of the cylindrically-shaped housing 356*a*. The camera 314 may be supported on structure that positions the camera 314 at or near a central portion of the housing 356. The outer lens 326 may be cylindrically shaped and disposed at an interior portion and about an interior cylindrical surface of the housing 356. A through hole or slot may be formed in the first housing 356*a* and aligned with the camera 314 so that the camera 314 views through the outer lens 326 at the slot.

As shown, pressurized fluid is received via a supply line or channel 362 at a turbine or other suitable receiving gear 358 that spins or rotates based on the pressurized fluid flowing through or across the turbine 358. The turbine 358 may be coupled to the outer lens 326 via a gear train 360, where movement of the turbine 358 drives the gear train 360 to impart pivotal motion of the outer lens 326. For example, a ring-shaped gear element 327 may be coupled to the outer lens 326 and the ring-shaped gear element 327 may engage and be driven by the gear train 360 coupled to the turbine 358. The gear train 360, turbine 358, and outer lens 326 may be accommodated by the protective outer shell 356.

For example, the outer lens 326 includes the ring-shaped gear element 327 at an end of the outer lens 326 and the gear train 360 engages the ring-shaped gear element 327. When the gear train 360 is driven by the turbine 358, a gear of the gear train 360 drives the ring-shaped gear element 327 to travel about the ring-shaped gear element 327 and rotate or spin the outer lens 326. A slip washer 329 may be disposed between the other end of the outer lens 326 and the housing cap 356*b* to reduce friction as the outer lens 326 is rotated.

The turbine 358 is received between an outer surface of the housing 356 and a turbine cap or housing 357. A sealing element or gasket 359 may be disposed between the cap 357 and the outer surface of the housing 356 to preclude washing fluid from leaking from the turbine housing 357. When pressurized fluid flows from the supply line 362 and across the turbine 358 within the turbine housing 357, the turbine 358 drives the gear train 360 coupled to the turbine 358 to rotate or spin the outer lens 326.

Optionally, pressurized washer fluid flows through or across the turbine 358 and into a supply channel or tube 344 that directs pressurized washer fluid at the outer lens 326 via a nozzle 342 disposed at an end of the supply channel 344. The supply channel 344 may extend between an outlet 357*a* at the turbine housing 357 and the nozzle 342. The nozzle 342 may be integrally formed with the cylindrical housing portion 356*a* at or near the outer cylindrical wall of the housing. The washer fluid may be directed via the nozzle 342 into the protective housing 356 and substantially parallel to a longitudinal axis of the housing 356, and thus substantially perpendicular to the viewing axis of the camera 314. A drainage outlet or tube 364 may be coupled to the protective housing 356 to allow the washer fluid to drain from the housing. Optionally, the outlet tube 364 is coupled to a vacuum source to draw washer fluid from the protective housing 356. Thus, pressurized washer fluid may be directed into the housing 356 and along the outer surface of the lens 326 via the nozzle 342, and the outer lens 326 is rotated relative to the housing 356 to remove contaminants and moisture at least from the portion of the outer lens 326 viewed through by the camera 314. The washer fluid is drained or vacuumed from the housing 356 via the drainage tube 364. Because the outer lens 326 is cylindrical, the washer fluid may remain between the outer lens 326 and the inner surface of the housing 356 with little to no moisture reaching the camera 314.

The camera module may be pivotably mounted at the vehicle and pivotable relative to the vehicle via actuation of an actuator. For example, the actuator may be operable to pivot the camera module about one or more pivot axes to allow for a varied field of view from one camera. This allows the camera to perform the function of multiple cameras, which may reduce the number of cameras installed at the vehicle, reduce the processing power needed to operate many cameras, and reduces costs.

For example, and referring to FIGS. 45-48, a camera module 414 is pivotably mounted at a mounting bracket 424 that is configured to mount at a vehicle equipped with the vehicular vision system. An actuator is coupled to the mounting bracket 424 and electrically operable to pivot the camera module 414 relative to the mounting bracket 424 to adjust the field of view of the camera. In the illustrated example, the camera module 414 is received between a front housing portion 416 and a rear housing portion 418. Respective pivot pins extend on opposing sides from the front housing portion 416 and are received by the mounting bracket 424 to define the pivot axis of the camera module. The pivot axis is substantially perpendicular to the viewing axis of the camera module (e.g., a longitudinal axis of the lens barrel) so that, when the camera is pivoted about the pivot axis, the field of view is adjusted upward and downward. Optionally, the camera 414 is pivotable relative to the mounting bracket 424 about a plurality of pivot axes.

An electrically operable motor 438 is disposed at the mounting bracket 424 and rotatably drives a gear train 460 to pivot the camera 414 about the pivot axis. For example, the electrically operable motor 438 is electrically operated in response to an input and drives a worm gear coupled to the motor, where the worm gear engages a main gear of the gear train 460. The gear train 460 engages an arcuate gear element 466 coupled to the front housing portion 416 so that, when the gear train 460 is rotatably driven by the motor 438, the arcuate gear element 466 is driven and the front housing portion 416 and camera 414 pivot about the pivot axis according to movement of the arcuate gear element 466. The arcuate gear element 466, pivot pins, and front housing portion 416 may be integrally formed, with the arcuate gear element 466 extending from the pivot pin. The motor 438 and gear train 460 may be accommodated between the mounting bracket 424 and a first cover or closeout portion 424*a* that couples to the mounting bracket 424.

A position feedback memory circuit board or potentiometer 468 (or other suitable position sensor) may be disposed at the mounting bracket 424 and configured to track the rotational position of the camera 414 relative to the mounting bracket 424. For example, the potentiometer 468 may include an electrically conductive trace disposed at a printed circuit board (PCB). Based on electrical signals received by the trace from an electric contact or wiper coupled to one of the pivot pins, the potentiometer tracks the position of the camera 414. Thus, the vision system may be configured to provide a memory function, where the actuator is operated to pivot the camera to a stored position to provide a preferred field of view. The potentiometer 468 may be accommodated between the mounting bracket 424 and a second cover or closeout portion 424*b* that couples to the mounting bracket 424.

The electrically operable motor 438 may be operated in response to an input, such as a user input at the interior portion of the vehicle or based on processing of image data captured by the camera 414, to pivot the camera 414 relative to the mounting bracket 424. When the camera 414 pivots relative to the mounting bracket 424, the field of view of the camera 414 changes and thus the view provided to the driver of the vehicle by video images derived from the captured image data changes.

Figures 49A, 49B:
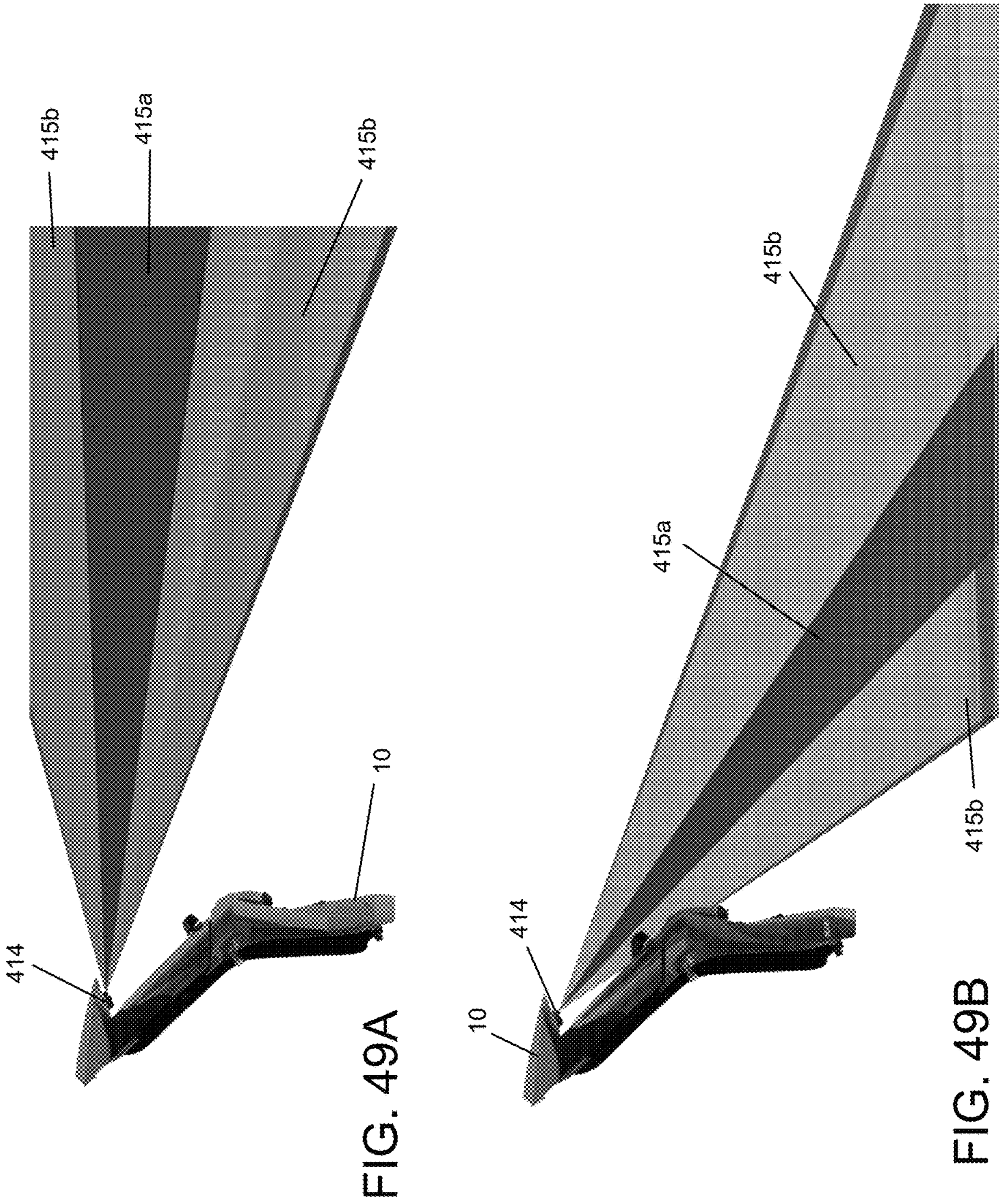
FIGS. 49A and 49B depict the field of view of the camera module when pivoted relative to the mounting bracket between different positions.

For example, and as shown in FIG. 49A, the camera 414 may be in a default position relative to the mounting bracket 424 (e.g., FIG. 47A) to provide a view rearward of the vehicle 10. The rearward view displayed to the driver via the display screen may be derived from a central portion 415*a* of the field of view of the camera 414. Peripheral or edge regions 415*b* of the field of view may not be included in the displayed video images and/or may have lower quality or warped images compared to the images representative of the central portion 415*a*. Based on an input, the actuator may pivot the camera upward (e.g., FIG. 47C) to provide a higher field of view, or the actuator may pivot the camera downward (e.g., FIG. 47B) to provide a lower field of view. While the displayed image can be tilted in software within the total field of view of the camera 414 and without physically tilting the camera 414, this may require using the image data from the limits or outer edge regions 415*b*, which can lead to issues with the picture quality due to the extra de-warp required at the limits.

Thus, the camera 414 is physically pivoted via the actuator to adjust the central portion 415*a* of the field of view to provide the high quality image data captured at the central portion 415*a* while adjusting the view provided to the driver. That is, mechanically tilting the camera allows the display to consistently use the center portion 415*a* of the field of view (which provides the best image quality). This may also lead to the use of a lens stack with a smaller field of view. In other words, a camera may be used with a smaller field if view because the camera's field of view can be mechanically adjusted.

The actuator may be operable responsive to any suitable input, such as a user input to pivot the camera or based on processed image data captured by the camera 414. The camera 414 may be pivoted based on detection of an object or obstacle in the field of view of the camera 414, such as to track the position of the detected object relative to the vehicle or to provide a better view of the detected object to the driver. The camera 414 may pivot to adjust the field of view automatically, such as upon switching into reverse. That is, the camera may be pivoted based on a gear selection at a gear selector of the vehicle. For example, and as shown in FIG. 49B, in response to the vehicle being placed into a reverse gear, the camera 414 may be tilted downward (e.g., FIG. 47B) to move the central portion 415*a* of the field of view downward and closer to the rear portion of the vehicle 10, to physically lower the field of view and provide a better view and backup aid to the driver of the vehicle.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos.

US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

The camera assembly or module may utilize aspects of the cameras and connectors described in U.S. Pat. Nos. 10,272,857; 10,250,004; 10,230,875; 10,142,532; 9,621,769; 9,277,104; 9,077,098; 8,994,878; 8,542,451 and/or 7,965,336, and/or U.S. Publication Nos. US-2009-0244361; US-2013-0242099; US-2014-0373345; US-2015-0124098; US-2015-0222795; US-2015-0327398; US-2016-0243987; US-2016-0268716; US-2016-0286103; US-2016-0037028; US-2017-0129419; US-2017-0133811; US-2017-0201661; US-2017-0280034; US-2017-0295306 and/or US-2018-0098033, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular camera module, the vehicular camera module comprising:

a housing assembly comprising an outer housing element and an inner housing element that is pivotable relative to the outer housing element, wherein the outer housing element is configured to mount the vehicular camera module at a vehicle, and wherein the inner housing element accommodates a transparent cover element that is pivotable together and in tandem with the inner housing element relative to the outer housing element;

a torsion spring engaged between the outer housing element and the inner housing element;

a camera accommodated by the housing assembly, wherein the camera is mounted to the outer housing element;

wherein, with the vehicular camera module mounted at the vehicle, and with the transparent cover element disposed at an aperture of the outer housing element, the camera views exterior of the vehicle via the transparent cover element of the inner housing element;

wherein, with the vehicular camera module mounted at the vehicle, and with the transparent cover element disposed at the aperture of the outer housing element, an outer surface of the transparent cover element is exposed exterior of the vehicle;

wherein, as the inner housing element and the transparent cover element pivot relative to the outer housing element and the camera, a wiper element of the outer housing element engages the outer surface of the transparent cover element of the inner housing element to remove moisture and/or debris from the outer surface of the transparent cover element; and wherein the inner housing element and the transparent cover element pivot relative to the outer housing element in a first direction, and wherein the torsion spring biases the inner housing element and the transparent cover element relative to the outer housing element in a second direction, and wherein the second direction is opposite to the first direction.

2. The vehicular camera module of claim 1, comprising an electrically operable solenoid that, when electrically energized, imparts pivotal movement of the inner housing element and the transparent cover element relative to the outer housing element.

3. The vehicular camera module of claim 2, wherein the electrically operable solenoid is electrically energized in response to an input.

4. The vehicular camera module of claim 3, wherein the input comprises a user actuatable input from a driver of the vehicle.

5. The vehicular camera module of claim 3, wherein the input comprises detection by a vision system of the vehicle of contaminants at the outer surface of the transparent cover element.

6. The vehicular camera module of claim 3, wherein the electrically operable solenoid is electrically energized upon vehicle startup.

7. The vehicular camera module of claim 1, wherein a counterweight is coupled to the inner housing element, and wherein the inner housing element and the transparent cover element pivot relative to the outer housing element responsive to gravitational force at the counterweight.

8. The vehicular camera module of claim 1, wherein the wiper element is disposed between an inner surface of the outer housing element and the outer surface of the transparent cover element.

9. The vehicular camera module of claim 1, wherein the wiper element comprises a first wiper element and a second wiper element, and wherein, as the inner housing element and the transparent cover element pivot relative to the outer housing element and the camera in a first direction, the transparent cover element moves toward the first wiper element and the first wiper element engages the outer surface of the transparent cover element to remove moisture and/or debris from the outer surface of the transparent cover element, and wherein, as the inner housing element and the transparent cover element pivot relative to the outer housing element and the camera in a second direction opposite to the first direction, the transparent cover element moves toward the second wiper element and the second wiper element engages the outer surface of the transparent cover element to remove moisture and/or debris from the outer surface of the transparent cover element.

10. The vehicular camera module of claim 1, wherein the camera comprises a CMOS imaging array, and wherein the CMOS imaging array comprises at least one million photosensors arranged in rows and columns.

11. A vehicular camera module, the vehicular camera module comprising:

- a housing configured to mount the vehicular camera module at a vehicle;
- a transparent cover element rotatably mounted at the housing;
- a camera accommodated by the housing, wherein, with the vehicular camera module mounted at the vehicle, the camera views exterior of the vehicle and through the transparent cover element;
- wherein the transparent cover element rotates relative to the housing about an axis of rotation that is parallel to a primary viewing axis of the camera;
- wherein, with the vehicular camera module mounted at the vehicle, an outer surface of the transparent cover element is exposed exterior of the vehicle;
- a turbine mechanically coupled to the transparent cover element; and
- wherein, with the vehicular camera module mounted at the vehicle, and when pressurized fluid flows across the turbine, the turbine rotatably drives the transparent cover element relative to the housing to remove moisture and/or debris from the outer surface of the transparent cover element.

12. The vehicular camera module of claim 11, wherein a wiper element engages the outer surface of the transparent cover element, and wherein the transparent cover element is rotatably driven relative to the housing and the wiper element to remove moisture and/or debris from the outer surface of the transparent cover element.

13. The vehicular camera module of claim 11, wherein a supply line extends between the turbine and a nozzle, and wherein, when the pressurized fluid flows across the turbine, the supply line carries the pressurized fluid from the turbine to the nozzle and the nozzle directs the pressurized fluid from the supply line toward the outer surface of the transparent cover element.

14. The vehicular camera module of claim 13, wherein the nozzle directs pressurized fluid at least partially into the housing, and wherein, with the vehicular camera module mounted at the vehicle, a vacuum powered drainage line is coupled to the housing for removing fluid from within the housing.

15. The vehicular camera module of claim 11, wherein a gear train mechanically couples the turbine and the transparent cover element.

16. The vehicular camera module of claim 15, wherein the transparent cover element is rotationally fixed to a ring-shaped gear element, and wherein the gear train drives the ring-shaped gear element to rotate the transparent cover element relative to the housing.

17. The vehicular camera module of claim 11, wherein the pressurized fluid comprises washer fluid.

18. The vehicular camera module of claim 11, wherein the camera comprises a CMOS imaging array, and wherein the CMOS imaging array comprises at least one million photosensors arranged in rows and columns.

19. A vehicular camera module, the vehicular camera module comprising:

- a housing assembly comprising an outer housing element and an inner housing element that is pivotable relative to the outer housing element, wherein the outer housing element is configured to mount the vehicular camera module at a vehicle, and wherein the inner housing element accommodates a transparent cover element that is pivotable together and in tandem with the inner housing element relative to the outer housing element;
- a torsion spring engaged between the outer housing element and the inner housing element;
- wherein a counterweight is coupled to the inner housing element, and wherein the inner housing element and the transparent cover element pivot relative to the outer housing element responsive to gravitational force at the counterweight;
- a camera accommodated by the housing assembly, wherein the camera is mounted to the outer housing element;
- wherein, with the vehicular camera module mounted at the vehicle, and with the transparent cover element disposed at an aperture of the outer housing element, the camera views exterior of the vehicle via the transparent cover element of the inner housing element;
- wherein, with the vehicular camera module mounted at the vehicle, and with the transparent cover element disposed at the aperture of the outer housing element, an outer surface of the transparent cover element is exposed exterior of the vehicle;
- wherein the outer housing element comprises a first wiper element and a second wiper element;
- wherein, as the inner housing element and the transparent cover element pivot relative to the outer housing element and the camera in a first direction, the transparent cover element moves toward the first wiper element and the first wiper element engages the outer surface of the transparent cover element to remove moisture and/or debris from the outer surface of the transparent cover element, and wherein, as the inner housing element and the transparent cover element pivot relative to the outer housing element and the camera in a second direction opposite to the first direction, the transparent cover element moves toward the second wiper element and the second wiper element engages the outer surface of the transparent cover element to remove moisture and/or debris from the outer surface of the transparent cover element; and
- wherein, when the inner housing element and the transparent cover element pivot relative to the outer housing element in the first direction, the torsion spring biases the inner housing element and the transparent cover element relative to the outer housing element in the second direction, and wherein, when the inner housing element and the transparent cover element pivot relative to the outer housing element in the second direction, the torsion spring biases the inner housing element and the transparent cover element relative to the outer housing element in the first direction.

20. The vehicular camera module of claim 19, comprising an electrically operable solenoid that, when electrically energized, imparts pivotal movement of the inner housing element and the transparent cover element relative to the outer housing element.

21. The vehicular camera module of claim 20, wherein the electrically operable solenoid is electrically energized in response to detection by a vision system of the vehicle of contaminants at the outer surface of the transparent cover element.

22. The vehicular camera module of claim 19, wherein the first wiper element and the second wiper element are respectively disposed between an inner surface of the outer housing element and the outer surface of the transparent cover element.

23. The vehicular camera module of claim 19, wherein the camera comprises a CMOS imaging array, and wherein the CMOS imaging array comprises at least one million photosensors arranged in rows and columns.

* * * * *